(12) United States Patent
Douceur et al.

(10) Patent No.: US 9,455,992 B2
(45) Date of Patent: Sep. 27, 2016

(54) TRUSTED HARDWARE COMPONENT FOR DISTRIBUTED SYSTEMS

(75) Inventors: John R. Douceur, Bellevue, WA (US); David M Levin, Waldorf, MD (US); Jacob R. Lorch, Bellevue, WA (US); Thomas Moscibroda, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1423 days.

(21) Appl. No.: 12/483,338

(22) Filed: Jun. 12, 2009

(65) Prior Publication Data
US 2010/0318786 A1 Dec. 16, 2010

(51) Int. Cl.
G06F 15/16 (2006.01)
H04L 29/06 (2006.01)
H04L 9/32 (2006.01)

(52) U.S. Cl.
CPC .......... H04L 63/123 (2013.01); H04L 9/3247 (2013.01); *H04L 29/06* (2013.01); *H04L 2209/127* (2013.01)

(58) Field of Classification Search
CPC ... H04L 29/06; H04L 63/123; H04L 9/3247; H04L 2209/127
See application file for complete search history.

(56) References Cited

U.S. PATENT DOCUMENTS

| | | | |
|---|---|---|---|
| 5,018,196 A * | 5/1991 | Takaragi et al. | 380/30 |
| 5,214,702 A * | 5/1993 | Fischer | 380/30 |
| 5,897,635 A * | 4/1999 | Torres et al. | |
| 6,055,518 A * | 4/2000 | Franklin | G06Q 20/3674 705/37 |
| 6,076,078 A * | 6/2000 | Camp | G06Q 20/045 380/268 |
| 6,154,764 A * | 11/2000 | Nitta et al. | 709/200 |
| 6,256,663 B1 * | 7/2001 | Davis | 709/204 |
| 6,289,374 B1 * | 9/2001 | Saito | 709/206 |
| 6,304,968 B1 * | 10/2001 | Hacker et al. | 713/153 |
| 6,421,704 B1 * | 7/2002 | Waldo | G06F 9/4411 707/999.202 |
| 6,789,126 B1 * | 9/2004 | Saulpaugh | G06F 9/465 709/201 |
| 6,931,431 B2 * | 8/2005 | Cachin et al. | 709/205 |
| 7,080,076 B1 * | 7/2006 | Williamson et al. | |
| 7,200,848 B1 * | 4/2007 | Slaughter | H04L 63/101 709/202 |

(Continued)

OTHER PUBLICATIONS

S. Kent et al.; RFC 2406; Nov. 1998; Network Working Group; 44 Pages.*

(Continued)

*Primary Examiner* — Krista Zele
*Assistant Examiner* — Anthony Fabbri
(74) *Attorney, Agent, or Firm* — Alin Corie; Sandy Swain; Micky Minhas

(57) ABSTRACT

Techniques for utilizing trusted hardware components for mitigating the effects of equivocation amongst participant computing devices of a distributed system are described herein. For instance, a distributed system employing a byzantine-fault-resilient protocol—that is, a protocol intended to mitigate (e.g., tolerate, detect, isolate, etc.) the effects of byzantine faults—may employ the techniques. To do so, the techniques may utilize a trusted hardware component comprising a non-decreasing counter and a key. This hardware component may be "trusted" in that the respective participant computing device cannot modify or observe the contents of the component in any manner other than according to the prescribed procedures, as described herein. Furthermore, the trusted hardware component may couple to the participant computing device in any suitable manner, such as via a universal serial bus (USB) connection or the like.

20 Claims, 10 Drawing Sheets

(56) References Cited

U.S. PATENT DOCUMENTS

| | | | |
|---|---|---|---|
| 7,353,396 B2* | 4/2008 | Micali | G06Q 20/02 713/176 |
| 7,424,615 B1* | 9/2008 | Jalbert et al. | 713/171 |
| 7,428,751 B2* | 9/2008 | Oom Temudo de Castro et al. | 726/10 |
| 7,454,521 B2 | 11/2008 | Howell et al. | |
| 7,478,243 B2* | 1/2009 | Bolosky | G06F 21/64 713/181 |
| 7,490,070 B2* | 2/2009 | Brickell | 705/75 |
| 7,505,970 B2* | 3/2009 | Adya et al. | |
| 7,657,751 B2* | 2/2010 | Micali | H04L 9/3247 709/213 |
| 7,716,486 B2* | 5/2010 | Libin | G07C 9/00103 713/176 |
| 7,966,487 B2* | 6/2011 | Engberg | H04L 9/3247 713/155 |
| 2002/0133701 A1* | 9/2002 | Lotspiech | G11B 20/00086 713/163 |
| 2003/0074402 A1* | 4/2003 | Stringer-Calvert | G06F 9/5061 709/203 |
| 2004/0073621 A1* | 4/2004 | Sampson | 709/209 |
| 2004/0095237 A1* | 5/2004 | Chen | F24F 11/0086 340/506 |
| 2004/0111608 A1* | 6/2004 | Oom Temudo de Castro et al. | 713/156 |
| 2004/0254967 A1* | 12/2004 | Cachin | 708/250 |
| 2005/0036616 A1* | 2/2005 | Huang | H04L 63/0838 380/255 |
| 2005/0198129 A1* | 9/2005 | Bolen et al. | 709/204 |
| 2007/0070930 A1* | 3/2007 | Abu-Amara | 370/315 |
| 2007/0176744 A1* | 8/2007 | Park et al. | 340/10.1 |
| 2008/0307223 A1* | 12/2008 | Brickell et al. | 713/158 |
| 2008/0320315 A1* | 12/2008 | Frey | H04L 9/3247 713/189 |
| 2009/0086979 A1* | 4/2009 | Brutch et al. | 380/279 |
| 2011/0055585 A1* | 3/2011 | Lee | H04L 9/0844 713/183 |

OTHER PUBLICATIONS

S. Kent et al.; RFC 2402; Nov. 1998; Network Working Group; 21 Pages.*

Lynch, "Distributed Algorithms", Morgan Kaufmann Publishers, Inc., San Francisco, CA., USA, 1996, 872 pgs.

Abd-El-Malek, "Fault-Scalable Byzantine Fault-Tolerant Services", retrieved on May 8, 2009 at <<http://www.pdl.cmu.edu/PDL-FTP/PASIS/sosp05.pdf>>, SOSP 2005, Oct. 23-26, 2005, Brighton, UK, 16 pages.

Adya, et al., "FARSITE: Federated, Available, and Reliable Storage for an Incompletely Trusted Environment", retrieved on May 8, 2009 at <<http://citeseerx.ist.psu.edu/viewdoc/download;jsessionid=35B37CFDC83E46BF38380EAE2337-9E88?doi=10.1.1.11.3814&rep=rep1&type=pdf>>, Appears in 5th Symposium on Operating Systems Design and Implementation (OSDI 2002), Boston, MA, Dec. 2002, 14 pages.

Baughman, et al., "Cheat-Proof Playout for Centralized and Distributed Online Games", retrieved on May 8, 2009 at <<http://prisms.cs.umass.edu/brian/pubs/baughman.infocom01.pdf>>, to appear in IEEE Infocom 2001, 11 pages.

Blanc, et al., "Designing Incentives for Peer-to-Peer Routing", retrieved on May 8, 2009 at <<http://www.cs.ucsd.edu/~vandat/papers/infocom05.pdf>>, University of California, San Diego, 12 pages.

Castro, et al., "Practical Byzantine Fault Tolerance and Proactive Recovery", retrieved on May 8, 2009 at <<research.microsoft.com/en-us/um/people/mcastro/publications/p398-castro-bft-tocs.pdf>>, ACM Transactions on Computer Systems, vol. 20, No. 4, Nov. 2002, pp. 398-461.

Chandramouli, et al., "Secure Domain Name System (DNS) Deployment Guide", retrieved May 8, 2009 at <<http://www.google.co.in/urlq=http://csrc.nist.gov/publications/nistpubs/800-81/SP800-81.pdf&ei=lwoJSu-tJo7UjAf25IWLCw&sa=X&oi=spellmeleon_result&resnum=1&ct=result&usg=AFQjCNHFdT-rmkfYOYW_HoGFPjaTo2N0qg>>, NIST Special Publication 800-81, Computer Security Div., National Institute of Standards and Technology, 103 pages.

Chun, et al., "Attested Append-Only Memory: Making Adversaries Stick to their Word", retrieved on May 8, 2009 at <<http://berkeley.intel-research.net/bgchun/a2m-sosp07.pdf>>, SOSP 2007, Oct. 14-17, 2007, Stevenson, WA., 16 pages.

Chun, et al., "Diverse Replication for Single-Machine Byzantine-Fault Tolerance", retrieved on May 8, 2009 at <<http://berkeley.intel-research.net/bgchun/diverserepl-usenix08.pdf>>, 6 pages.

Cohen, "Incentives Build Robustness in BitTorrent", retrieved on May 8, 2009 at <<http://www.bittorrent.org/bittorrentecon.pdf>>, May 22, 2003, pp. 1-5.

Cowling, et al., "HQ Replication: A Hybrid Quorum Protocol for Byzantine Fault Tolerance", retrieved on May 8, 2009 at <<http://people.csail.mit.edu/cowling/hq/hq-osdi06.pdf>>, Appearing in the 7th USENIX Symposium on Operating System Design and Implementation (OSDI), Nov. 2006, pp. 1-14.

Dijk, et al., "Proof of Freshness: How to efficiently use an online single secure clock to secure shared untrusted memory", retrieved on May 8, 2009 at <<http://csg.csail.mit.edu/pubs/memos/Memo-496/memo496.pdf>>, MIT Computer Science and Artificial Intelligence Laboratory (CSAIL), pp. 1-20.

England, et al., "A Trusted Open Platform", retrieved on May 8, 2009 at <<http://download.microsoft.com/download/c/8/0/c80ea683-9900-46ff-9c67-d7f14b0d3787/trusted_open_platform_ieee.pdf>>, IEEE Computer Society, Jul. 2003, pp. 55-62.

GauthierDickey, et al., "Low Latency and Cheat-proof Event Ordering for Peer-to-Peer Games", retrieved on May 8, 2009 at <<http://web.cs.du.edu/~chrisg/publications/chrisg-nossdav04.pdf>>, NOSSDAV 2004, Jun. 18, 2004, Cork, Ireland, 6 pages.

Gupta, et al., "CompuP2P: An Architecture for Sharing of Computing Resources in Peer-to-Peer Networks With Selfish Nodes", retrieved on May 27, 2009 at <<http://ecpe.ee.iastate.edu/dcnl/Publications/docs/Conf-Pub/DCNL-CN-2004-406.pdf>>, 6 pages.

Haeberlen, et al., "PeerReview: Practical Accountability for Distributed Systems", retrieved on May 8, 2009 at <<http://www.mpi-sws.org/~ahae/papers/peerreview-sosp07.pdf>>, SOSP 2007, Oct. 14-17, Stevenson, WA., 14 pages.

Ho, et al., "Nysiad: Practical Protocol Transformation to Tolerate Byzantine Failures", retrieved on May 8, 2009 at <<http://www.cs.cornell.edu/home/rvr/papers/nysiad.pdf>>, 14 pages.

Hughes, et al., "Free Riding on Gnutella Revisited: the Bell Tolls'?", retrieved on May 8, 2009 at <<http://www.comp.lancs.ac.uk/~geoff/Publications/DSO05.pdf>>, Computing Department, Lancaster University, Lancaster, UK, 13 pages.

Kallahalla, et al., "Plutus: Scalable secure file sharing on untrusted storage", retrieved on May 8, 2009 at <<http://www.hpl.hp.com/research/ssp/papers/FAST2003-plutus.pdf>>, Appears in the Proceedings of the 2nd Conference on File and Storage Technologies (FAST 2003), pp. 29-42, (Mar. 31-Apr. 2, 2003, San Francisco, CA), Published by USENIX, Berkeley, CA, 14 pages.

Katz, et al., "Introduction to Modern Cryptography", Chapman & Hall / CRC Press, 2007, 20 pgs.

Kotla, et al., "Zyzzyva: Speculative Byzantine Fault Tolerance", retrieved on May 8, 2009 at <<http://www.sosp2007.org/papers/sosp052-kotla.pdf>>, SOSP 2007, Oct. 14-17, 2007, Stevenson, WA., 14 pages.

Kubiatowicz, et al., "OceanStore: An Architecture for Global-Scale Persistent Storage", retrieved on May 8, 2009 at <<http://oceanstore.cs.berkeley.edu/publications/papers/pdf/asplos00.pdf>>, Appears in Proceedings of the Ninth International Conference on Architectural Support for Programming Languages and Operating Systems (ASPLOS 2000), Nov. 2000, pp. 1-12.

Lamport, et al., "The Byzantine Generals Problem", retrieved on May 8, 2009 at <<research.microsoft.com/en-us/um/people/lamport/pubs/byz.pdf>>, ACM Transactions on Programming Languages and Systems, vol. 4, No. 3, Jul. 1982, pp. 382-401.

Levin, et al., "BitTorrent is an Auction: Analyzing and Improving BitTorrent's Incentives", retrieved on May 8, 2009 at <<http://ccr.sigcomm.org/online/files/p243-levin.pdf>>, SIGCOMM 2008, Aug. 17-22, 2008, Seattle, WA., pp. 243-254.

(56) References Cited

OTHER PUBLICATIONS

Li, et al., "Secure Untrusted Data Repository (SUNDR)", retrieved on May 8, 2009 at <<http://pdos.csail.mit.edu/~max/docs/sundr.pdf>>, NYU Department of Computer Science, 16 pages.

Lian, et al., "Robust Incentives via Multi-level Tit-for-tat", retrieved on May 8, 2009 at <<http://iptps06.cs.ucsb.edu/papers/Lian-maze06.pdf>>, 6 pages.

Locher, et al., "Free Riding in BitTorrent is Cheap", retrieved on May 8, 2009 at <<http://www.dcg.ethz.ch/publications/hotnets06.pdf>>, Hot Nets, Session 5: Anti/Social, pp. 85-90.

Maheshwari, et al., "How to Build a Trusted Database System on Untrusted Storage", retrieved on May 8, 2009 at <<http://portal.acm.org/ft_gateway.cfm?id=1251239&type=pdf&coll=GUIDE&dl=GUIDE&CFID=35206457&CFTOKEN=74007715>>, STAR Lab, InterTrust Technologies Corporation, Santa Clara, CA., 16 pages.

Maymounkov, et al., "Kademlia: A Peer-to-peer Information System Based on the XOR Metric", retrieved on May 8, 2009 at <<http://www.cs.rice.edu/Conferences/IPTPS02/109.pdf>>, New York University, pp. 1-6.

Muthitacharoen, et al., "Ivy: A Read/Write Peer-to-Peer File System", retrieved on May 8, 2009 at <<http://pdos.csail.mit.edu/ivy/osdi02.pdf>>, MIT Laboratory for Computer Science, Cambridge, MA, 14 pages.

Nagel, "Subversion Version Control: Using the Subversion Version Control System in Development Projects", retrieved on Apr. 14, 2005 at <<http://www.informit.com/content/images/0131855182/downloads/Nagel_book.pdf>>, Pearson Education, Inc, 2005, 365 pages.

Ngan, et al., "Incentives-Compatible Peer-to-Peer Multicast", retrieved on May 8, 2009 at <<http://www.cs.rice.edu/~twngan/doc/p2pecon04.pdf>>, Department of Computer Science, Rice University, 6 pages.

Perrig, et al., "SAM: A Flexible and Secure Auction Architecutre Using Trusted Hardware", retrieved on May 8, 2009 at <<http://sparrow.ece.cmu.edu/~adrian/projects/SAM/SAM.pdf>>, pp. 1-10.

Piatek, et al., "Do incentives build robustness in BitTorrent?", retrieved on May 8, 2009 at <<http://www.cs.washington.edu/homes/isdal/papers/bittyrant_nsdi.pdf>>, 14 pages.

Rhea, et al., "Handling Churn in a DHT", retrieved on May 8, 2009 at <<http://www.srhea.net/papers/bamboo-usenix.pdf>>, Appears in Proceedings of the USENIX Annual Technical Conference, Jun. 2004, pp. 1-14.

Sarmenta, et al., "Virtual Monotonic Counters and Count-Limited Objects using a TPM without a Trusted OS", retrieved on May 8, 2009 at <<http://people.csail.mit.edu/devadas/pubs/ccs-stc06.pdf>>, STC 2006, Nov. 3, 2006, Alexandria, Virginia, 15 pages.

Sirivianos, et al., "Dandelion: Cooperative Content Distribution with Robust Incentives", retrieved on May 8, 2009 at <<http://www.cs.duke.edu/~msirivia/publications/dandelion-netecon.pdf>>, Department of Computer Science, University of CA, Irvine, pp. 1-11.

Sirivianos, et al., "Free-riding in BitTorrent Networks with the Large View Exploit", retrieved on May 8, 2009 at <<http://research.microsoft.com/en-us/um/redmond/events/iptps2007/papers/sirivianosparkchenyang.pdf>>, Department of Computer Science, University of California, Irvine, pp. 1-6.

Stoica, et al., "Chord: A Scalable Peer-to-peer Lookup Service for Internet Applications", retrieved on May 8, 2009 at <<http://pdos.csail.mit.edu/papers/chord:sigcomm01/chord_sigcomm.pdf>>, SIGCOMM 2001, Aug. 27-31, San Diego, CA, pp. 1-12.

"Trusted Platform Module Specification v1.2 Enhances Security", retrieved on May 8, 2009 at <<http://files.ieiworld.com/files/Ref-File/20060508_Enano-8523T/TPM_collateral_English_by_Trusted_Computing_Group.pdf>>, Trusted Computing Group, 2004, pp. 1-6.

Vandiver, et al., "Tolerating Byzantine Faults in Transaction Processing Systems using Commit Barrier Scheduling", retrieved on May 8, 2009 at <<http://people.csail.mit.edu/benmv/hrdb-sosp07.pdf>>, SOSP 2007, Oct. 14-17, Stevenson, WA., 14 pages.

Veronese, et al., "Minimal Byzantine Fault Tolerance", retrieved on May 8, 2009 at <<http://docs.di.fc.ul.pt/jspui/bitstream/10455/2966/1/08-29.pdf>>, Departamento de Informatica, Faculdade de Ciencias da Universidade de Lisboa, Campo Grande, Lisboa, Portugal, Nov. 2008, 20 pages.

Vesperman, "Essential CVS, 2nd Edition", O'Reilly, 2006, 430 pages.

Vidal, "Multiagent Coordination Using a Distributed Combinatorial Auction", retrieved on May 8, 2009 at <<http://jmvidal.cse.sc.edu/papers/vidal06a.pdf>>, AAAI Workshop on Auction Mechanisms for Robot Coordination, 2006, pp. 1-7.

Vishnumurthy, et al., "KARMA: A Secure Economic Framework for Peer-to-Peer Resource Sharing", retrieved on May 8, 2009 at <<http://www.cs.cornell.edu/~vivi/karma.pdf>>, Department of Computer Science, Cornell University, New York, pp. 1-6.

White, "Securing BGP through Secure Origin BGP (soBGP)", retrieved on May 8, 2009 at <<ftp://ftp-eng.cisco.com/sobgp/presentations/BCR-soBGP.pdf>>, 8 pages.

Zhong, et al., "Sprite: A Simple, Cheat-Proof, Credit-Based System for Mobile Ad-Hoc Networks", retrieved on May 8, 2009 at <<http://www.ieee-infocom.org/2003/papers/48_04.PDF>>, IEEE INFOCOM 2003, 11 pages.

\* cited by examiner

700

710 — TRUSTED ADMINISTRATOR SENDS THE ENCRYPTED SYMMETRIC KEYS TO COMPUTING DEVICES 102(1)-(N)

712 — EACH COMPUTING DEVICE PASSES ENCRYPTED SYMMETRIC KEY TO A TRUSTED HARDWARE COMPONENT FOR DECRYPTION WITH PRIVATE KEY

714 — TRUSTED HARDWARE COMPONENT STORES THE SYMMETRIC KEY AND ASSIGNS TO LOGICAL COUNTER

TRUSTED HARDWARE COMPONENT FOR DISTRIBUTED SYSTEMS

BACKGROUND

A simple yet remarkably powerful tool of selfish and malicious participants in a distributed system is "equivocation": making conflicting statements to others. Multiple techniques exist to combat the ability of participants to effectively equivocate within distributed systems. For instance, envision that a distributed system consists of participants "A", "B", and "C". Here, when Participant C sends a message to Participant A, Participant A may ask Participant B if, in the past, Participant C has sent a conflicting message to Participant B. If Participant B answers in the affirmative, then Participant A may determine that Participant C is untrustworthy, and may remove Participant C from the view of Participant A. While these and other existing techniques prove effective, more efficient techniques may exist.

SUMMARY

Techniques for efficiently and securely mitigating the effects of participant equivocation within a distributed system are described herein. These techniques provide a trusted hardware component for each of multiple participants of the distributed system. In some instances, this trusted hardware component includes a monotonically non-decreasing counter and a cryptographic key.

Just before a first participant sends a message to a second participant, the first participant may provide a representation (e.g., a hash value) of the message to the trusted hardware component of the first participant. In response, the trusted hardware component may increment the counter and sign a statement attesting that the trusted hardware component incremented the counter in response to receiving the representation of the message. At this point, the trusted hardware component may provide the signed statement to the first participant, who in turn may store the signed statement in a log maintained in un-trusted memory of the first participant. The first participant may also provide the signed statement along with the actual message to the second participant. The second participant may then verify the validity of the message with use of the signed statement and, in some instances, with use of a log provided by the first participant upon request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
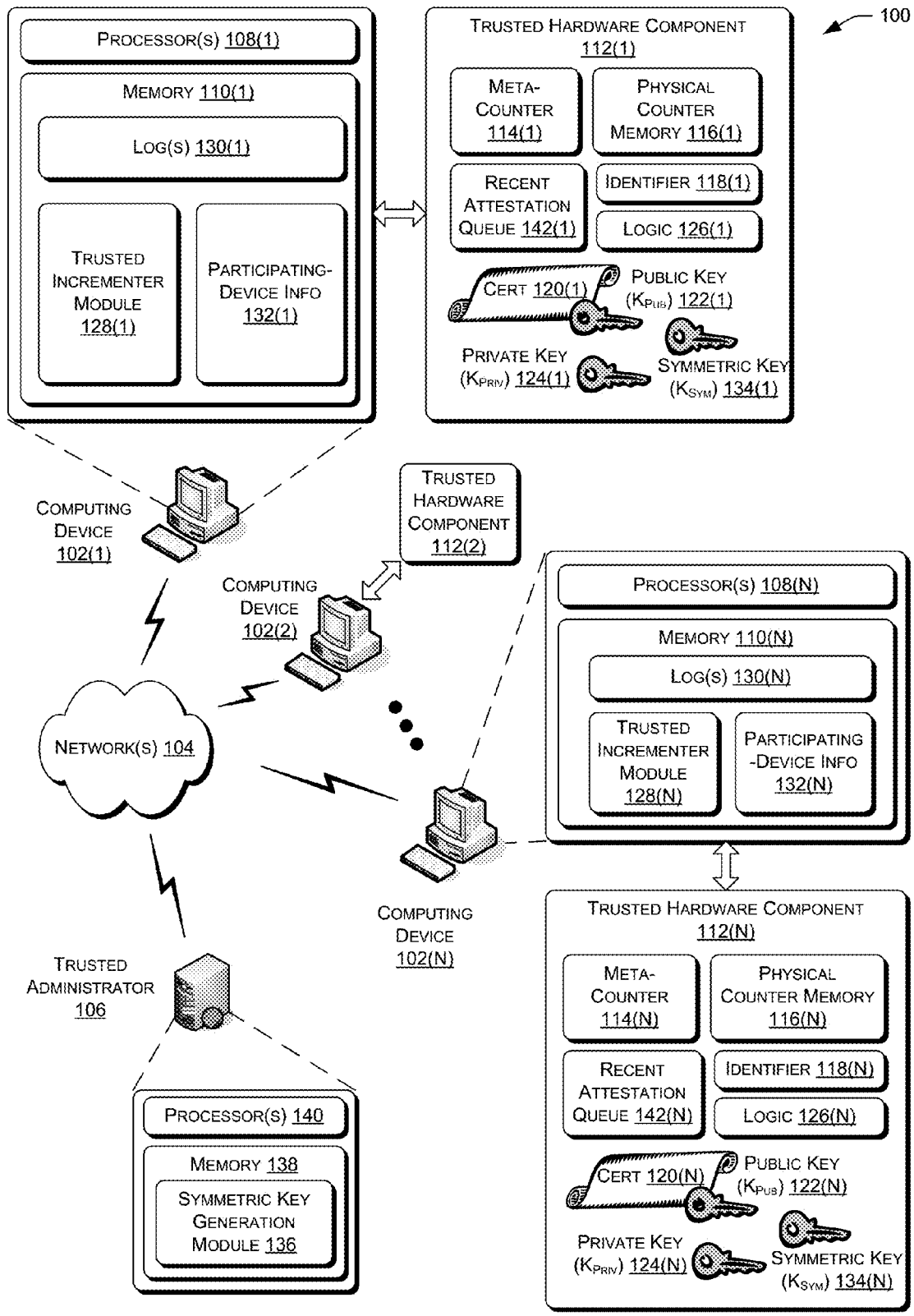
FIG. 1 illustrates an example computing architecture in which multiple participant computing devices of a distributed system each utilize a respective trusted hardware component for mitigating the effects of equivocation within the system. As illustrated in the example, each trusted hardware component may include one or more counters and one or more cryptographic keys. Further, each participant computing device may log attestations made by the trusted hardware component in un-trusted memory rather than within the trusted hardware component itself.

The disclosure describes techniques for utilizing trusted hardware components for mitigating the effects of equivocation amongst participant computing devices of a distributed system. For instance, a distributed system that employs a byzantine-fault-resilient protocol—that is, a protocol intended to mitigate (e.g., tolerate, detect, isolate, etc.) the effects of byzantine faults—may employ these techniques. Other types of distributed protocols may also use these techniques to mitigate the effects of faults.

To mitigate the effects of faults, the techniques may utilize a trusted hardware component comprising a non-decreasing counter and a key. This hardware component may be "trusted" in that the respective participant computing device (also referred to as a "participant device" or, simply, a "participant") cannot modify the contents of the component in any manner other than according to the prescribed procedures, as described below. In addition, this hardware component is "trusted" in that participants of the distributed protocol cannot inspect the contents of the device, such as any stored private or symmetric keys described below. Furthermore, the trusted hardware component may couple to the participant computing device in any suitable manner, such as via a universal serial bus (USB) connection, directly on the motherboard of the computing device or in any other manner.

Before a first participant computing device sends a message to a second participant device, the first participant may initially provide a representation (e.g., a hash value or any other suitable representation) of the message to the trusted hardware component associated with the first participant device. In response, the trusted hardware component may increment a current value of the counter of the component to a new, greater value. For example, the counter may update the value from "0" to "1" for a first message representation.

Furthermore, the trusted hardware component may use the key of the component to sign a statement attesting to the incrementing of the counter in association with the representation of the message.

At this point, the trusted hardware component may provide the signed statement to the participant device (that is, to a portion of the device outside of the trusted hardware component). Upon receiving the signed statement, the participant device may store the signed statement in a log that maintains the signed statements received from the trusted hardware component for the current conversation and protocol.

Furthermore, the participant device may maintain this log in un-trusted memory (e.g., a conventional disk drive or the like) or otherwise external to the trusted hardware component. By doing so, the techniques allow the size of the trusted hardware component to remain small. In addition, this allows the log to continue to grow in size, with only the size of the disk drive of the computing device constraining its size. As such, storing the log in un-trusted memory may further allow for a nearly unbounded size of the log, given the size of conventional disk drives. As a result, the participant computing device may truncate this log according to the protocol—rather than by necessity due to storage-size constraints.

In any event, after logging this signed statement, the participant device may send the signed statement along with the associated message to the second participant device. In response, the second participant device may verify the validity of the signed statement to ensure that the trusted hardware component of the first participant device did indeed attest to the signed statement. The trusted hardware component may verify the statement with use of a public key of the trusted hardware component associated with the first participant device, or with a symmetric key shared by both trusted hardware components, as discussed below.

In addition, the second participant device may store the signed statement (or an indication based on the signed statement) for the purpose of ensuring a complete understanding of everything the first participant device has said in the conversation. Stated otherwise, the signed statement along with the associated counter values may enable the second participant device to maintain a record of messages sent by the first participant device. This information may help the second participant device track what the first participant device has said in order to help determine whether the first participant device has made equivocating statements to other participant devices.

In addition, if the second participant device desires to view some or all of the statements made by the first participant device (e.g., because the second participant is new to the conversation or for any other reason), the second participant device may request a portion or the entire log that the first participant device maintains. In response, the first participant device, which may then send some or all of the log that the first participant device maintains to the second participant.

In response to receiving the log, the second participant may verify the validity of the signature and may thereafter use the received log to inspect previous messages sent by the first participant. If the second participant locates a discrepancy or another cause of concern in the log, the second participant may choose to remove the first participant from the view of the second participant in the protocol (i.e., may no longer continue communicating with the first participant).

The discussion begins with a section entitled "Example Computing Architecture," which describes one non-limiting environment that may implement the described techniques. This section depicts and describes a high-level architecture, as well as illustrative components of a participant computing device. Next, a section entitled "Example Flow Diagrams" illustrates and describes the techniques in the context of participant devices setting up a distributed protocol and using the described techniques to mitigate the effects of equivocation within the protocol. This section includes sub-sections entitled "Allocating Counters", "Verifying Message Validity", "Generating Symmetric Keys" and "Maintaining Security in the Event of a Power Failure". A third section, entitled "Example Processes", illustrates and describes example processes using the described techniques in a distributed system. A fourth section ("Additional Details of Example Techniques") and its sub-sections follow and describe additional details of certain implementations of the techniques. Finally, the discussion ends with a brief conclusion.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement the described techniques for efficiently and securely mitigating the effects of equivocation by participants of a distributed system. The architecture 100 may include multiple computing devices 102(1), 102(2), ..., 102(N) coupled together via a network 104 to form a distributed system. While not illustrated, respective users may operate each of the one or more computing devices 102(1)-(N). The network 104, meanwhile, represents any one or combination of multiple different types of networks, interconnected with each other and functioning as a single large network (e.g., the Internet or an intranet). The network 104 may include wire-based networks (e.g., cable) and wireless networks (e.g., cellular, satellite, etc.).

Within the distributed system, the computing devices 102(1)-(N) may converse via any agreed-upon distributed protocol. For instance, the computing devices 102(1)-(N) may employ a byzantine-fault-resilient protocol—a protocol designed to mitigate the effects of byzantine faults within a distributed system. A byzantine-fault-resistant protocol may include a byzantine-fault-tolerant protocol, a byzantine-fault-detection protocol and/or a byzantine-fault-isolation protocol, possibly in addition to any other protocol that mitigates the effects of byzantine faults. As illustrated, the architecture 100 may also include a trusted administrator 106 to assist in setting up the distributed protocol that the computing devices 102(1)-(N) may employ, as discussed in greater detail below.

Each of the computing devices 102(1)-(N) may include a respective processor 108(1), 108(2), ..., 108(N) as well as memory 110(1), 110(2), ..., 110(N). In addition, each of the computing devices 102(1)-(N) may include or otherwise have access to a respective trusted hardware component 112(1), 112(2), ..., 112(N). In some instances, and as illustrated, the trusted hardware components 112(1)-(N) reside physically proximate or within the respective computing devices 102(1)-(N). For instance, one or more of the trusted hardware components 112(1)-(N) may reside as a piece of hardware physically within a housing of a respective computing device 102(1)-(N) or may connect via a serial bus (e.g., USB) or the like. In other instances, meanwhile, one or more of the trusted hardware components 112(1)-(N) may reside remotely (e.g., over a network) from a corresponding computing device 102(1)-(N).

In either instance, the trusted hardware components 112(1)-(N) function to efficiently and securely assist in preventing the computing devices 102(1)-(N) from effectively making equivocating statements within the distributed system. Stated otherwise, these components help to mitigate the effects of any such equivocation within the system.

As illustrated, each trusted hardware component 112(1)-(N) may include a meta-counter 114(1), 114(2), . . . , 114(N) and a physical portion of memory 116(1), 116(2), . . . , 116(N) reserved for allocation to one or more logical counters ("Physical Counter Memory"). Each meta-counter 114(1)-(N) essentially comprises a counter of logical counters. That is, and as described below, a meta-counter may assign its current value to a new logical counter when the respective participant device requests allocation of a new logical counter.

In addition, each trusted hardware component 112(1)-(N) may comprise a unique identifier 118(1), 118(2), . . . , 118(N) associated with the hardware component and a certificate 120(1), 120(2), . . . , 120(N) that leads back to a root of trust that can verify the validity of the trusted hardware component with reference to the unique identifier 118(1)-(N).

Each trusted hardware component 112(1)-(N) may provide its respective certificate 120(1)-(N) to the other computing devices participating in the protocol to allow these devices to verify the legitimacy of the trusted hardware component. Note that, in some instances, each trusted hardware component 112(1)-(N) may refrain from storing this certificate 120(1)-(N) but may instead provide the certificate to the devices in other ways. For example, in some instances the certificate may reside on the physical packaging of the trusted hardware component, thus allowing a user of the trusted hardware component to share the certificate with the other participant devices.

In addition, each trusted hardware component 112(1)-(N) may include a public key 122(1), 122(2), . . . , 122(N) and a corresponding private key 124(1), 124(2), . . . , 124(N). The trusted hardware component 112(1)-(N) may use the private key 124(1)-(N) to sign certain attestations, as discussed in detail below, while the hardware component may provide its respective public key 122(1)-(N) to the other participant devices to allow these devices to verify the signature. Again, however, note that the trusted hardware components 112(1)-(N) may refrain from actually storing the public keys 122(1)-(N). Instead, a respective trusted hardware component may again provide the public key in other ways. For example, the public key may reside on the physical packaging of the trusted hardware component, thus allowing a user of the trusted hardware component to share the public key with the other participant devices. Each trusted hardware component 112(1)-(N) may also comprise logic 126(1), 126(2), . . . , 126(N) comprising computer-executable instructions and embodied as hardware, software or a combination thereof.

FIG. 1 also illustrates that memory 110(1)-(N) of computing devices 102(1)-(N) may also store a respective trusted incrementer module 128(1), 128(2), . . . 128(N), one or more logs 130(1), 130(2), . . . , 130(N) and information 132(1), 132(2), . . . , 132(N) associated with messages previously sent by other participant devices of the distributed system ("Participant-Device Information").

In combination, these elements enable a secure and efficient fault-resilient distributed system. First, when the participant computing devices 102(1)-(N) set up a distributed protocol, each computing device 102(1)-(N) asks the respective trusted hardware component 112(1)-(N) to allocate a logical counter to the new protocol. In response, the logic 126(1)-(N) of the hardware component locates an available logical counter and asks the respective meta-counter 114(1)-(N) to assign an identifier to the logical counter. In some instances, this logical counter comprises a monotonically non-decreasing counter as discussed in detail below.

In addition, the logic 126(1)-(N) may associate the private key 124(1)-(N) of the local hardware component or a symmetric key 134(1), 134(2), . . . , 134(N) common to each hardware component to the logical counter and, hence, to the protocol. As discussed in detail below, the trusted administrator 106 may include a symmetric key generation module 136 (stored in memory 138 and executable on one or more processors 140) to generate the shared symmetric key 134(1)-(N) and to provide copies of the respective symmetric key to the trusted hardware components 112(1)-(N).

After set up of the protocol and allocation of the counters, the computing device 102(1) may desire to send a message to one or more other participant devices of the architecture 100. At this point, the trusted incrementer module 128(1) may first send a representation (e.g., a hash value) of the message to the trusted hardware component 112(1) associated with the participant device. The logic 126(1) of the trusted hardware component 112(1) may receive this representation of the message and, in response, may increment the assigned logical counter by one or by another value specified by the device 102(1) (e.g., specified with the sending of the representation of the message). In addition, the logic 126(1) may use either the private key 124(1) or the symmetric key 134(1) to sign a statement attesting to the increment of the counter in association with the representation of the message.

At this point, the logic 126(1) of the trusted hardware component 112(1) may store the signed statement to a respective recent attestation queue (RAQ) 142(1), 142(2), . . . , 142(N), which may store a predetermined number of recent signed statements (e.g., five, ten, fifty, one hundred, etc.). In addition, the logic 126(1) may provide the signed statement to the trusted incrementer module 128(1) of the participant computing device 102(1). In response, the trusted incrementer module 128(1) may store the signed statement in the log 130(1) associated with this particular conversation. As discussed in detail below, this log 130(1) may store some or all of the previously-signed statements provided by the trusted hardware component 112(1). With this information, the participant computing device 102(1) may show to the other participant devices 102(2)-(N) each statement that the participant computing device 102(1) has made during the conversation.

After storing this signed statement in the appropriate log 130(1), the participant computing device 102(1) may send the message along with the signed statement to the intended recipient participant device. In response to receiving this signed statement, the receiving participant device may either use the public key to verify the signed statement (if the trusted hardware component 112(1) signed the statement with the private key 124(1)) or the device may pass the signed statement to its associated trusted hardware component (if the trusted hardware component 112(1) signed the statement with the symmetric key 134(1)). In the latter instances, the trusted hardware component may attempt to verify the message and, in order to keep the symmetric key secret, may simply inform the receiving computing device as to whether or the not the signature was verified.

In addition to maintaining each device's own log 130(1)-(N), each participant computing device 102(1)-(N) may maintain the information 132(1)-(N) about the other participant devices. More particularly, this information 132(1)-(N) may comprise information relevant to the particular protocol in which the devices participate. This information 132(1) may include each signed statement sent by the other participant devices (i.e., may comprise each log of each other participant device) or may instead include an indication as to whether everything that each participant device previously said has been consistent and non-equivocating. In either instance, by requiring each participant device to send a signed statement along with each message, each participant device may determine whether or not each other device has been making equivocating statements or is otherwise untrustworthy.

Figure 2:
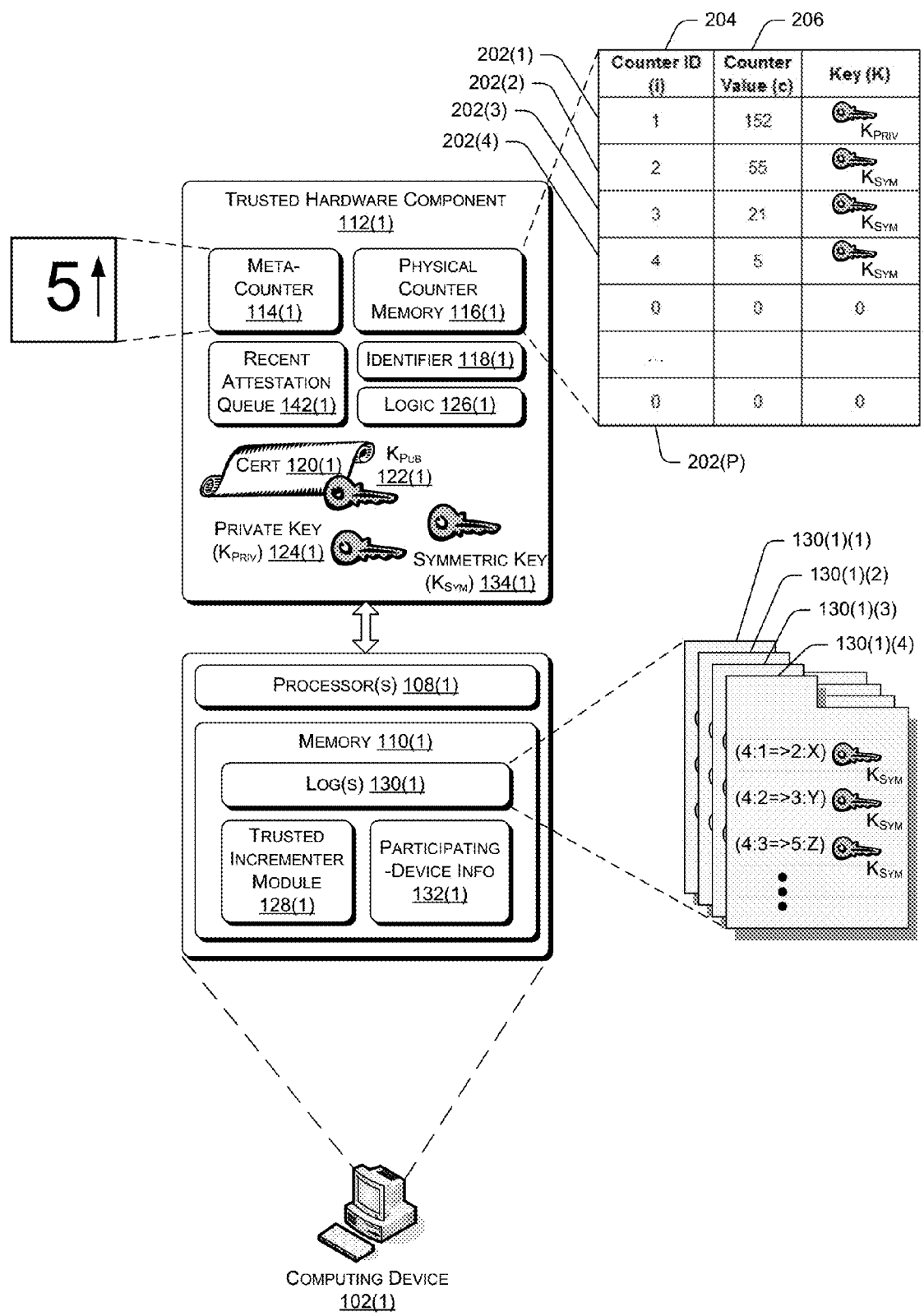
FIG. 2 is a block diagram of a participant computing device of FIG. 1 in greater detail. As illustrated in the example, the participant computing device may include a meta-counter, multiple logical counters each associated with a particular conversation and protocol, and multiple logs each associated with a particular logical counter and, hence, with a particular conversation and protocol.

FIG. 2 is a block diagram of the participant computing device 102(1) of FIG. 1 in greater detail. As illustrated, the participant computing device 102(1) includes the trusted hardware component 112(1) of FIG. 1, which includes the meta-counter 114(1) of FIG. 1. The meta-counter 114(1) may comprise a monotonically-increasing counter that increments by one whenever a new logical counter is deployed and assigned. For instance, when the trusted hardware component 112(1) is first deployed, the meta-counter may have an initial current value of one ("1").

Then, when the computing device 102(1) first requests to set up a new protocol while employing the trusted hardware component 112(1), the logic 126(1) may assign the current value (one) of the meta-counter 114(1) to the deployed logical counter. In addition, the logic 126(1) may increment the meta-counter by one (here, from one to two).

FIG. 2 also illustrates that the physical counter memory 116(1) has space for a number ("P") of logical counters 202(1), 202(2), . . . , 202(P). Further, the logic 126(1) of the trusted hardware component 112(1) in the instant example has deployed four logical counters 202(1), . . . , 202(4) running within the physical counter memory 116(1) of the trusted hardware component 112(1) in the instant example. Each of these four logical counters is associated with a particular conversation and a particular protocol in which computing device 102(1) participates.

As illustrated, each logical counter 202(1)-(P) may be associated with a counter identification ("i") 204, a current counter value ("c") and a key ("K"). As discussed immediately above, the counter ID "i" may comprise the value of the meta-counter 114(1) when the logic 126(1) originally deploys the particular logical counter. As such, even if a future logical counter employs the same physical memory space as a previous logical counter, the future logical counter will be associated with a unique, higher-value counter ID (because the meta-counter can only be increased, never decreased).

The counter value "c", meanwhile, comprises the current value of the counter. As discussed above, before the participant computing device 102(1) sends a message to another participant device, the participant device 102(1) may send a representation of the message to the trusted hardware component 112(1). In turn, the logic 126(1) may increment the current value, c, of the counter (or move the counter value in place as discussed below), sign a statement attesting to the increment and provide the signed statement to the computing device 102(1). As such, the counter value 206 comprises a value that steadily increases as the participant device 102(1) sends communications within the conversation associated with the logical counter 202(1). The counter value 206 can only be reset if a new logical counter is associated to this counter, in which case the meta-counter assigns a different (higher) counter ID (204) to this counter.

Finally, the key 208 comprises the key associated with the particular counter and, hence, with the particular protocol and conversation associated with the counter. As discussed above and as discussed in greater detail below, the logic 126(1) may assign the unique private key 124(1) to the logical counter and protocol or may assign a commonly-held symmetric key to the logical counter and protocol.

FIG. 2 further illustrates that the computing device 102(1) may maintain a log 130(1) associated with each protocol (and with each logical counter) outside of the trusted hardware component 112(1). Specifically, the device 102(1) may maintain these logs 130(1) in un-trusted memory of the device (e.g., on a conventional disk drive or in any other conventional or non-conventional storage). As illustrated, these logs may comprise the previously-signed statements provided by the trusted hardware component 112(1), subject to standard truncation of the logs as called upon by the respective protocol. FIG. 2 further illustrates that the participant device 102(1) maintains four logs 130(1)(1), 130(1)(2), . . . , 130(1)(4), each of which corresponds to one of the four logical counters 202(1)-(4) that the trusted hardware component 112(1) currently employs.

To illustrate a single signed statement from the log associated with the logical counter 202(4), this example and non-limiting log includes the following statement: "4:2=>3: Y" as signed by the symmetric key. This statement indicates that the trusted hardware component 112(1) incremented the logical counter 202(4) (having an "i" of 4) from a "c" value of 2 and to a next value ("c' (prime)") of 3. Furthermore, this statement indicates that the trusted hardware component incremented the counter in response to the participant device 102(1) sending a representation of a message "Y" to the trusted hardware component 112(1).

Example Flow Diagrams

Having described an illustrative architecture that may implement the trusted hardware components 112(1)-(N) in a distributed system, as well as details of the trusted hardware components themselves, the discussion proceeds to an example process for allocating a logical counter to a particular protocol. Next, the discussion describes use of the trusted hardware components 112(1)-(N) in practice. Finally, the discussion describes an example process for generating symmetric keys for these hardware components as well as an example process for maintaining security of the logs in the event of a power failure of a participant device.

Allocating Counters

Figure 3:
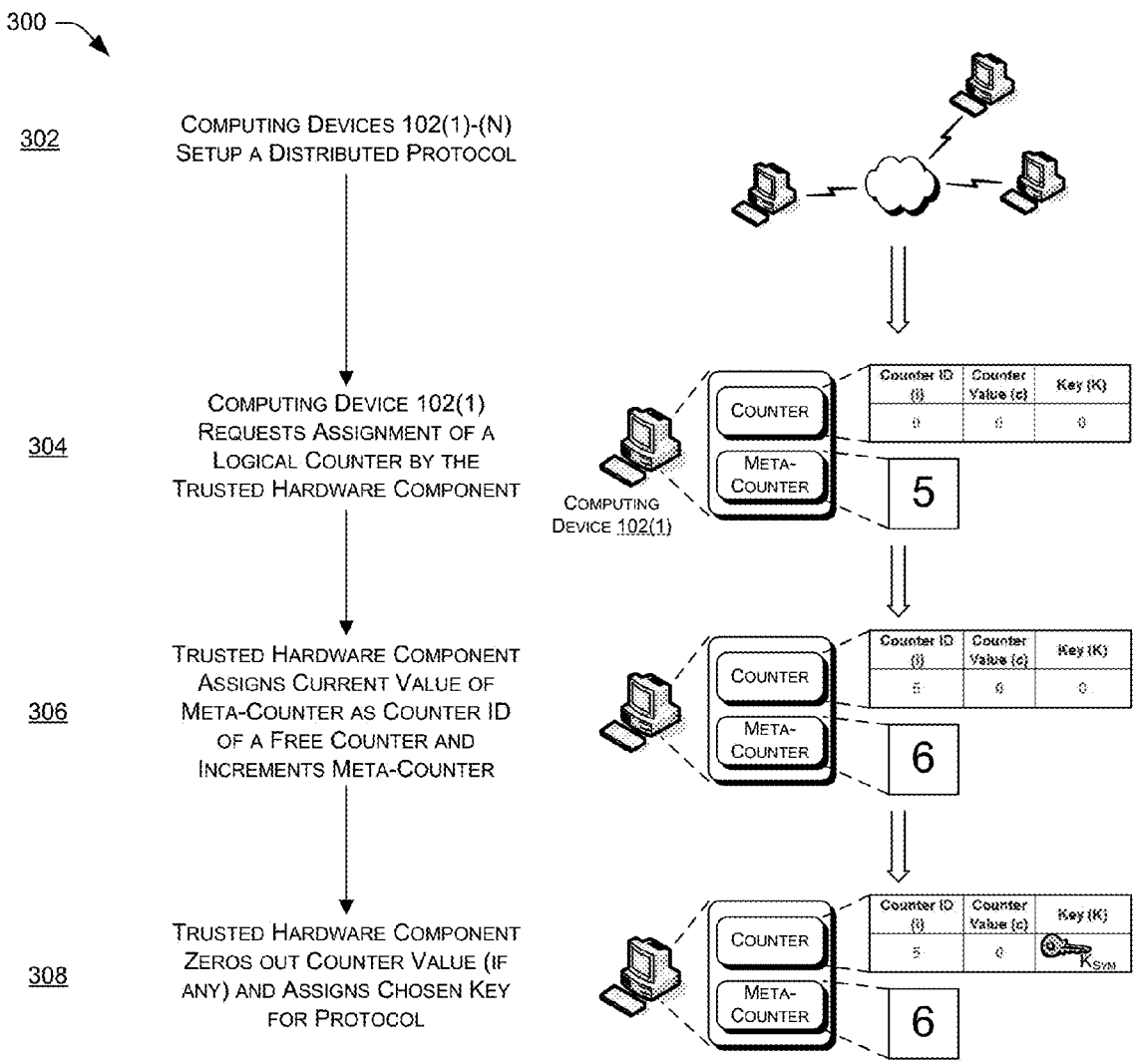
FIG. 3 is a flow diagram illustrating an example process for allocating a logical counter of FIG. 2 when a participant computing device desires to participate in a distributed protocol.

FIG. 3 is a flow diagram illustrating an example process 300 for allocating a logical counter 202 of FIG. 2 when the participant computing device 102(1) desires to participate in a distributed protocol.

The process 300 includes an operation 302, at which point the computing devices 102(1)-(N) set up a distributed conversation to follow a particular protocol. For instance, these devices may set up a byzantine-fault-resilient protocol or another distributed protocol. In the former instances, the devices may set up a byzantine-fault-tolerant protocol, a byzantine-fault-detection protocol, a byzantine-fault-isolation protocol or another protocol designed to mitigate the effects of byzantine faults.

At operation 304, the computing device 102(1) may request that the trusted hardware component 112(1) assign a new logical counter to the new conversation at operation 304. In response, the logic 126(1) of the trusted hardware component 112(1) may determine a current value of the meta-counter 114(1) of the trusted hardware component 112(1). In the instant example, the meta-counter 114(1) has a current value of five. As such, the logic 126(1) finds a free logical counter and assigns the counter identity (i) of "5" to this logical counter at operation 306. In addition, the value of the meta-counter is increased, by one (in this example) to a new current value of "6."

At this point, the logic 126(1) of the trusted hardware component 112(1) may also zero out the counter value (c) of any previous logical counter that occupied this physical counter space as well as the previous key used by this previous logical counter at operation 308. For instance, if a previous logical counter had been used in this physical memory space, then the values from that previous logical counter may still exist in the memory. As such, the logic 126(1) may delete this information to make way for the new logical counter.

In addition, at operation 308 the logic 126(1) may also assign, to this logical counter, a key chosen by the computing device 102(1) for this protocol. For instance, if the computing devices 102(1)-(N) agree to use respective private keys for this protocol, then the logic 126(1) may assign the private key 124(1) to the counter. In other instances, meanwhile, the computing devices 102(1)-(N) may agree to use a symmetric key that each trusted hardware component (and each logical counter used for the protocol) will share. In these instances, the computing devices 102(1)-(N) may request that the trusted administrator 106 generate a symmetric key (as illustrated and described below with reference to FIGS. 7-8). Here, after receiving the symmetric key from the trusted administrator 106, the computing device 102(1) may assign the symmetric key 134(1) to this counter. In either instance, the completed process 300 results in a trusted hardware component 112(1) having a logical counter configured for use in the new conversation in which the computing device 102(1) participates.

Verifying Message Validity

Figure 4:
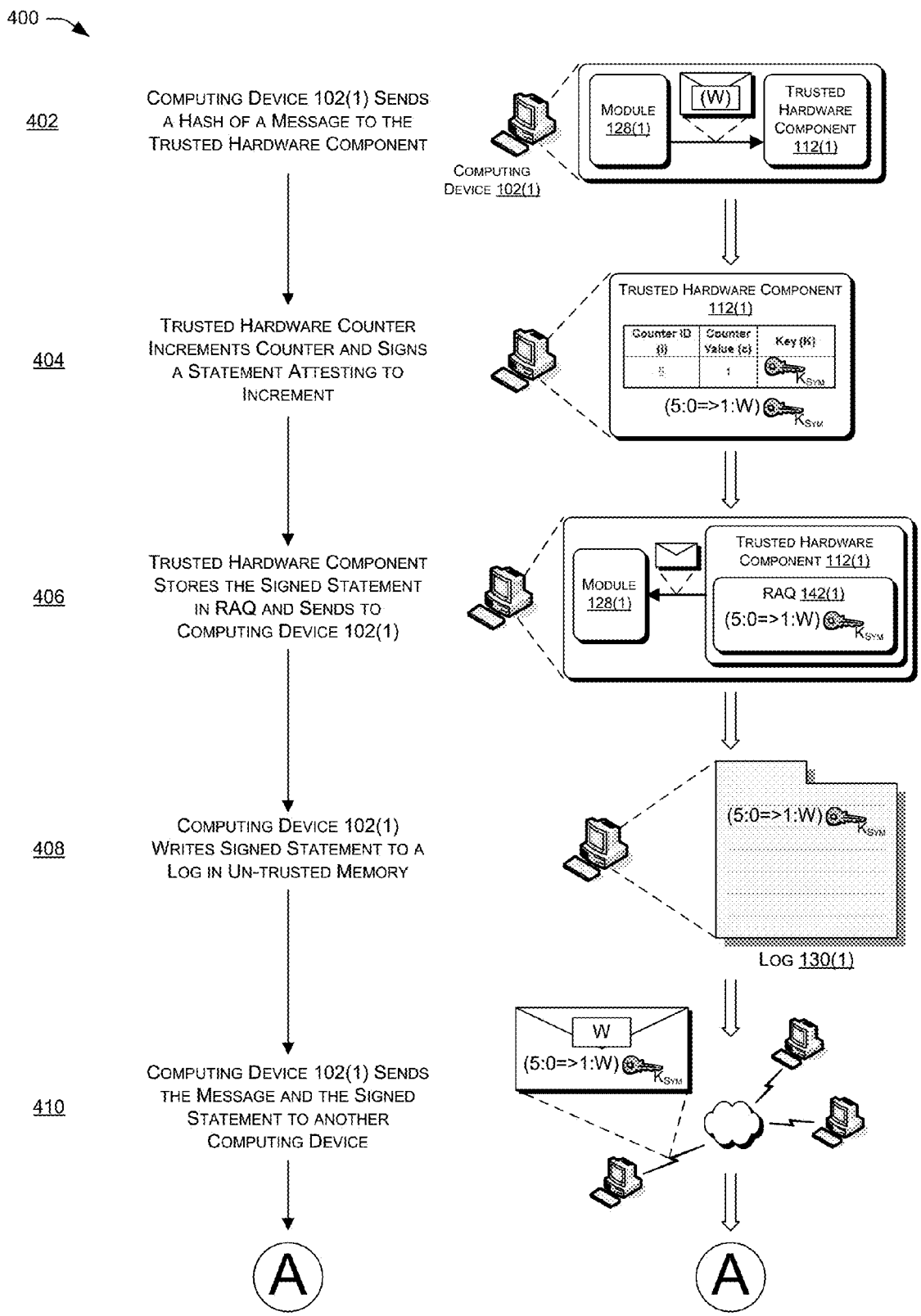
FIGS. 4-6 comprise a flow diagram illustrating an example process for utilizing a trusted hardware component for the purpose of mitigating the effects of equivocation in a distributed system.
Figure 5:
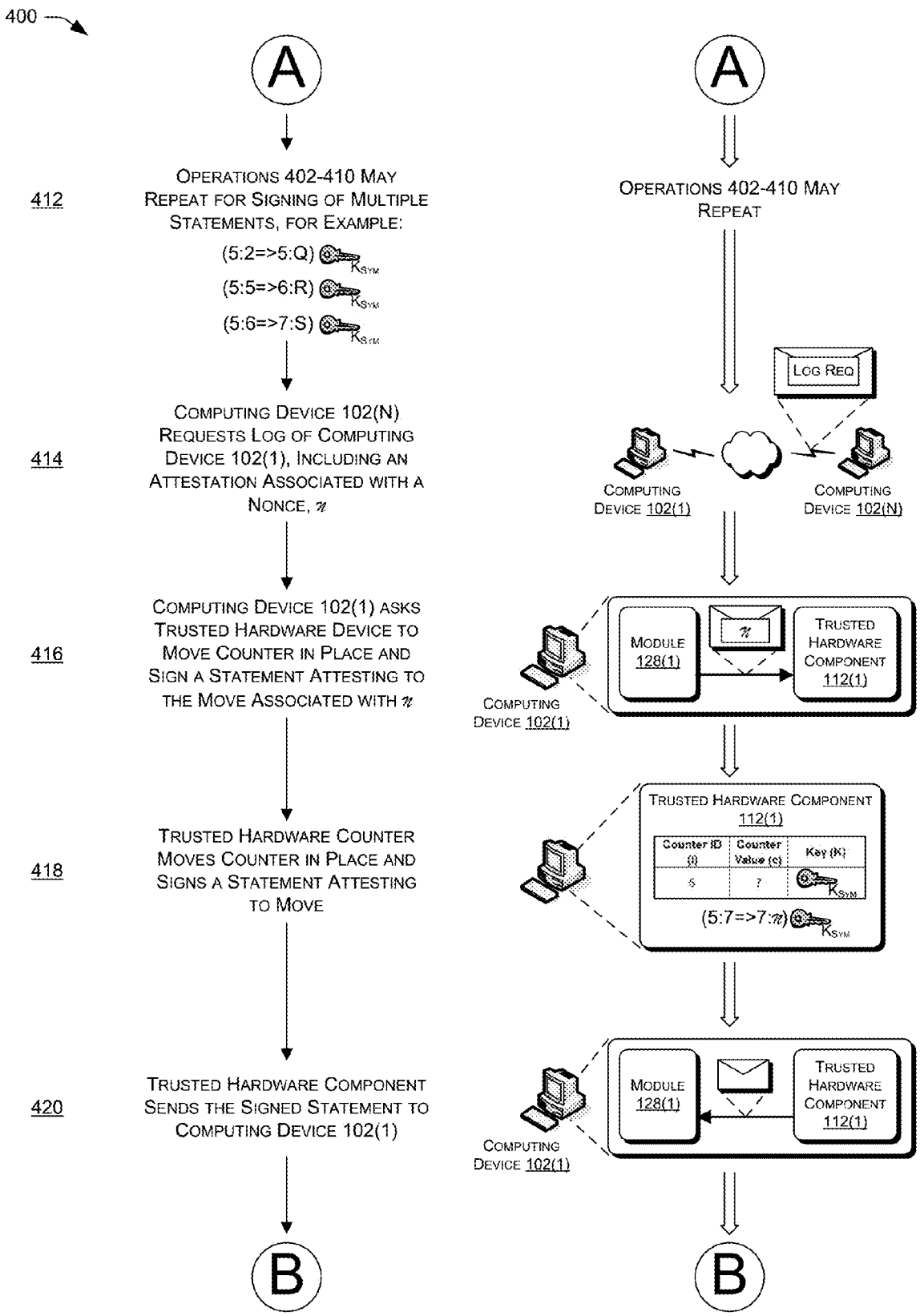
Figure 6:
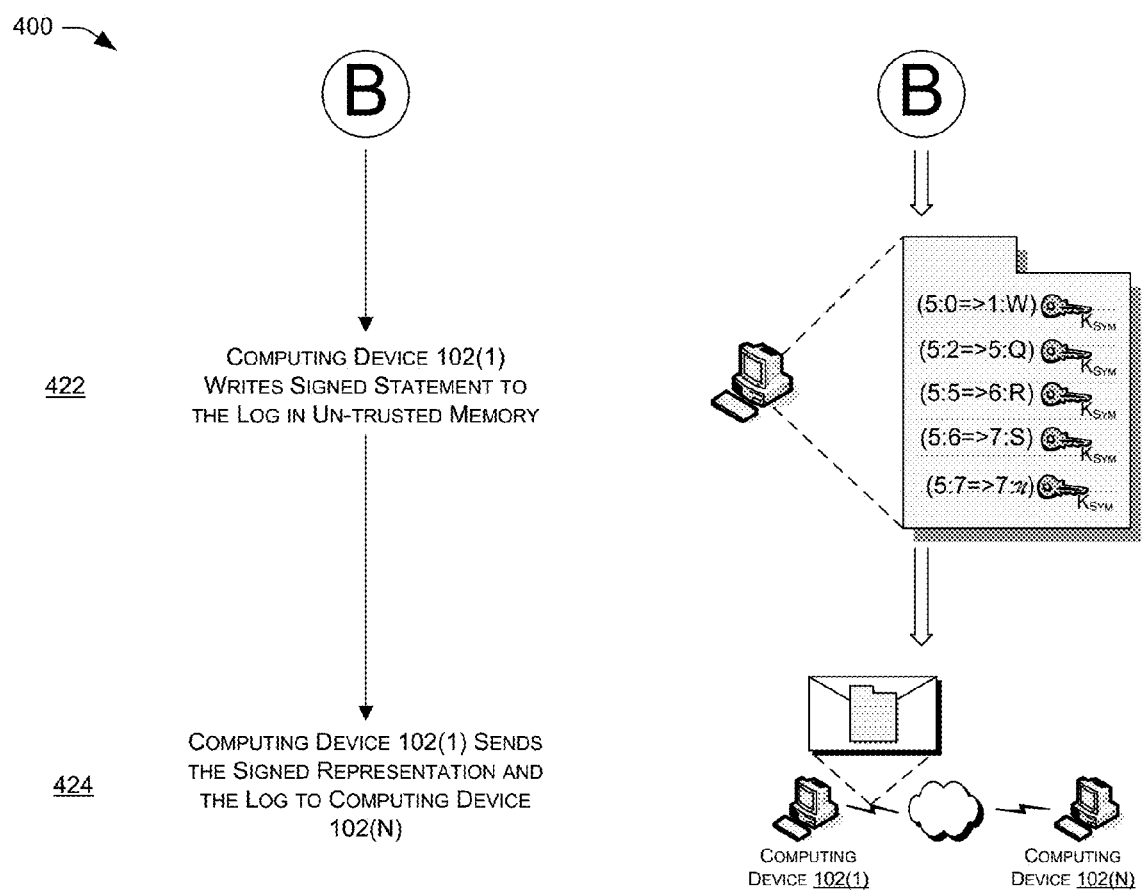

FIGS. 4-6 comprise a flow diagram illustrating an example process 400 for utilizing the trusted hardware components 112(1)-(N) for the purpose of mitigating the effects of (e.g., detecting, tolerating, isolating, etc.) equivocation in a distributed system. For instance, the process 400 may occur after the setting up of a new conversation and the allocating of the logical counter, discussed immediately above with reference to FIG. 3.

The process 400 begins at operation 402 with the computing device 102(1) sending a message to another computing device participating in the distributed protocol. To do so, however, the techniques may call for the computing device 102(1) to first request and receive an attestation from the trusted hardware component 112(1). As such, the process 400 may first include the computing device 102(1) sending, to the trusted hardware component 112(1), a hash of the message "W" that is for distribution to the other participant. While this process describes hashes, it is to be appreciated that other implementations may employ other suitable representations of the message, including the message itself.

The process 400 continues to operation 404, at which point the trusted hardware component 112(1) may increment the logical counter assigned to this particular conversation and protocol. For instance, the trusted hardware component 112(1) may increment logical counter "5" from a current counter value of "0" to a new counter value of "1". In addition, the trusted hardware component 112(1) may sign a statement attesting that the trusted hardware component 112(1) incremented the counter at least in part in response to receiving the hash ("(W)") of the message from the participant device 102(1). Here, the trusted hardware component 112(1) may sign that statement with a symmetric key that is common to each trusted hardware component of the protocol.

In some implementations, this signed statement may take the following form: "(i:c=>c':M)K", where M comprises the message or the representation of the message. As such, the example signed statement here comprises the following: "(5:0=>1:W)$K_{Sym}$". This statement indicates that the trusted hardware component 112(1) incremented the logic counter 5 from a value of 0 to a value of 1 in response to receiving the representation of the message W. In addition, the trusted hardware component 112(1) signed this statement with the symmetric key 134(1).

The trusted hardware component 112(1) may store the signed statement in the recent attestation queue (RAQ) 142(1) at operation 406. While this operation is illustrated as occurring after the incrementing of the counter at operation 404, in some implementations the signed statement is stored atomically with the incrementing of the counter or, in some instances, even before the counter is incremented. As discussed above, the RAQ 142(1) may store a predetermined number or size of the most recent statements that the trusted hardware component 112(1) has signed. As discussed below in detail with reference to FIG. 9, the RAQ is useful to maintain log legitimacy in the event of a power failure. Returning to the process 400, meanwhile, the trusted hardware component 112(1) may also send the signed statement to the computing device 102(1).

Next, at operation 408, the computing device 102(1) may write the signed statement to the log 130(1) associated with this conversation and protocol. In some implementations, this log resides in un-trusted (that is, conventional) memory of the device and outside of the trusted hardware component 112(1). Note that while the log 130(1) resides in un-trusted memory, the log nonetheless comprises a trusted log because of the unique signed statement(s) stored therein. Operation 410 then represents that the computing device 102(1) may send the actual message, W, and the corresponding signed statement "(5:0=>1:W)$K_{Sym}$" to the recipient participant devices, such as the participant device 102(N).

FIG. 5 continues the illustration of the process 400. At operation 412, the operations 402-410 may be repeated. As illustrated, the computing device 102(1) may have sent messages "Q", "R" and "S" to other devices participating in the protocol. In addition, the trusted hardware component 112(1) may have signed statements attesting to incrementing the logical counter in response to receiving the hash values of the messages, including a statement "5:2=>5:Q". As this statement illustrates, in some implementations the computing device 102(1) itself may actually provide the new counter value, c', which may instruct the particular value to which the trusted hardware component should increment the logical counter.

At operation 414, the participant device 102(N) may request the log 130(1) associated with the current conversation and protocol from the participant device 102(1). In addition, the participant device 102(N) may also include a randomly-generated "number used once", or "nonce". That is, the device 102(N) may include a nonce that would be exceedingly difficult and statistically unlikely for the receiving device 102(1) to predict. In addition, the requesting device 102(N) may request that the trusted hardware component 112(1) move the logical counter in place in response to receiving the nonce and sign a statement attesting to that move. As such, the requesting device can assure itself that the participant device 102(1) sent the full contents of the log (or, at least, that it has not avoided sending more recent signed statements than what is provided in the sent log).

At operation 416, the computing device 102(1) may request that the trusted hardware component 112(1) move the counter in place in response to receiving the nonce and sign a statement attesting to the move. At operation 418, the trusted hardware component 112(1) may oblige by moving in place the counter and signing the statement. As illustrated, this statement comprises the following: "5:7=>7:n". At operation 420, the trusted hardware component 112(1) may then send the signed statement to the computing device 102(1).

FIG. 6 continues the illustration of the process 400, and illustrates the computing device 102(1) writing the signed statement to the log 130(1) stored in the un-trusted memory of the computing device 102(1) at operation 422. While process 400 illustrates device 102(1) writing this statement corresponding to the counter's movement-in-place to the log, in other instances computing device 102(1) may only write statements that correspond to an actual change in a counter value. As such, computing device 102(1) may refrain from writing the signed statement associated with the counter's movement-in-place to the log.

At operation 424, the computing device 102(1) then sends the log to the requesting device 102(N). In addition, in instances where computing device 102(1) does not store the signed statement associated with the nonce within the log, computing device 102(1) may also send this signed statement along with the log to the requesting computing device 102(N).

Generating Symmetric Keys

Figure 7:
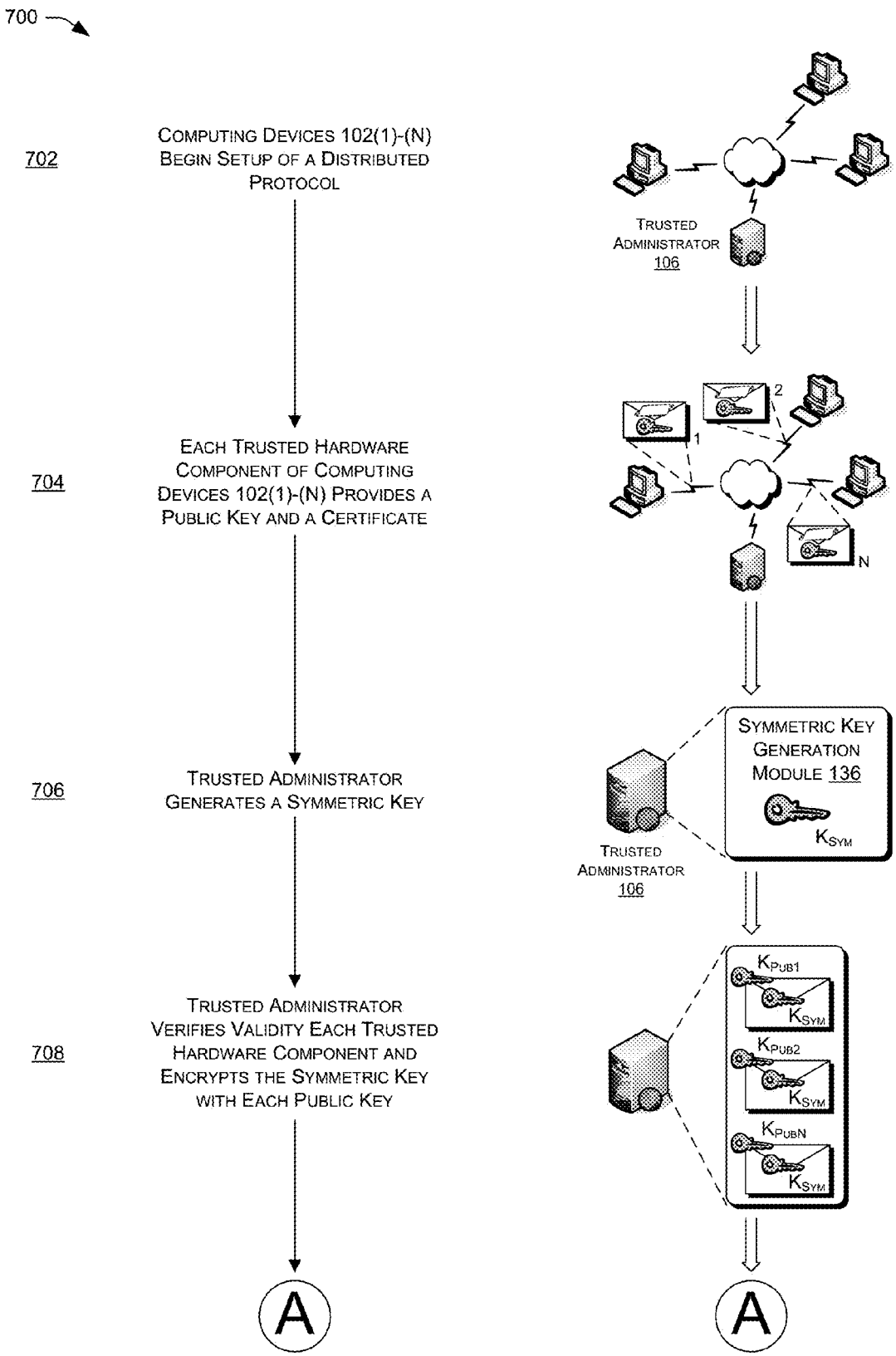
FIGS. 7-8 comprise a flow diagram illustrating an example process for generating a symmetric key for use by each trusted hardware component of a distributed system.
Figure 8:
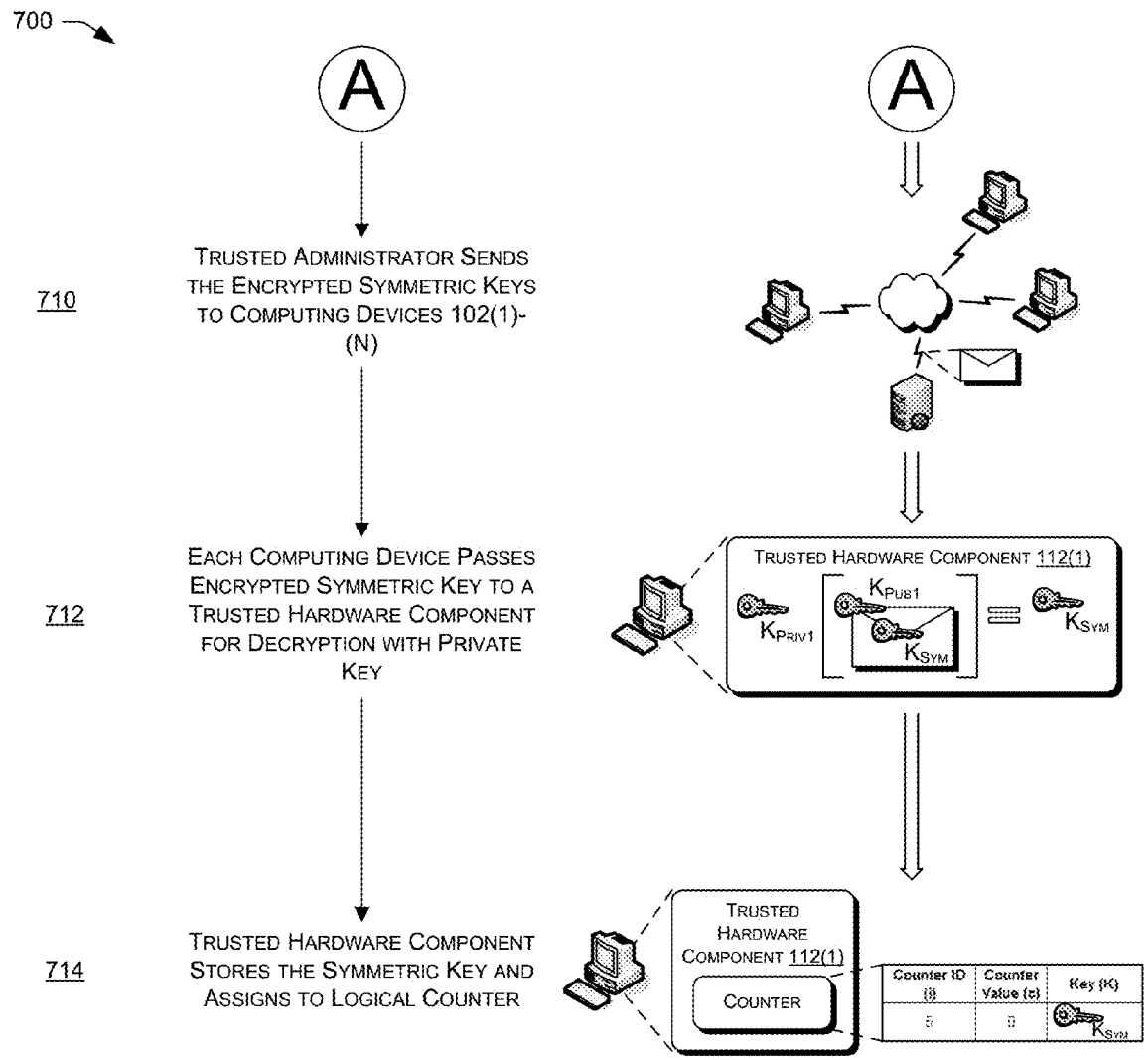

FIGS. 7-8 next illustrate a flow diagram of an example process 700 for generating a symmetric key for use by each trusted hardware component 112(1)-(N) of a distributed system. The process 700 begins with the computing devices 102(1)-(N) setting up a distributed protocol at operation 702. Next, at operation 704, each trusted hardware component 112(1)-(N) of each of the devices may provide a public key 122(1)-(N) and a certificate 120(1)-(N) to the trusted administrator 106 that is responsible for generating and providing copies of the symmetric keys 134(1)-(N).

At operation 706, the trusted administrator 106 may generate a symmetric key with use of the symmetric key generation module 136 of FIG. 1. The trusted administrator 106 may then verify the validity of some or all of the trusted hardware components 112(1) with use of the received certificates at operation 708. That is, the trusted administrator 106 may traverse each certificate to the corresponding root of trust. The trusted administrator 106 may then determine whether the root of trust is indeed a trusted entity. If so, then the trusted administrator 106 may also encrypt a copy of the symmetric key 134(1)-(N) with each public key of each trusted hardware component 112(1)-(N) at operation 708.

FIG. 8 continues the illustration of the process 700 and includes the trusted administrator 106 sending the encrypted symmetric keys 134(1)-(N) to the computing devices 102 (1)-(N) at operation 710. At operation 712, each computing device 102(1)-(N) may pass the encrypted symmetric keys to a corresponding trusted hardware component 112(1)-(N), since the encrypted message must be decrypted with the private keys 124(1)-(N) that are secret to the respective trusted hardware components 112(1)-(N). Upon receipt, each trusted hardware component 112(1)-(N) may decrypt the encrypted symmetric key 134(1)-(N) with use of a respective private key 124(1)-(N) of the respective trusted hardware component 112(1)-(N).

Next, each trusted hardware component 112(1)-(N) may store the symmetric key at operation 714 and assign this symmetric key to the logical counter associated with the newly-set-up conversation. At this point, each participant device 102(1)-(N) is able to participate in the conversation with use of the verification techniques described immediately above with reference to FIGS. 4-6.

Maintaining Security in the Event of a Power Failure

Figure 9:
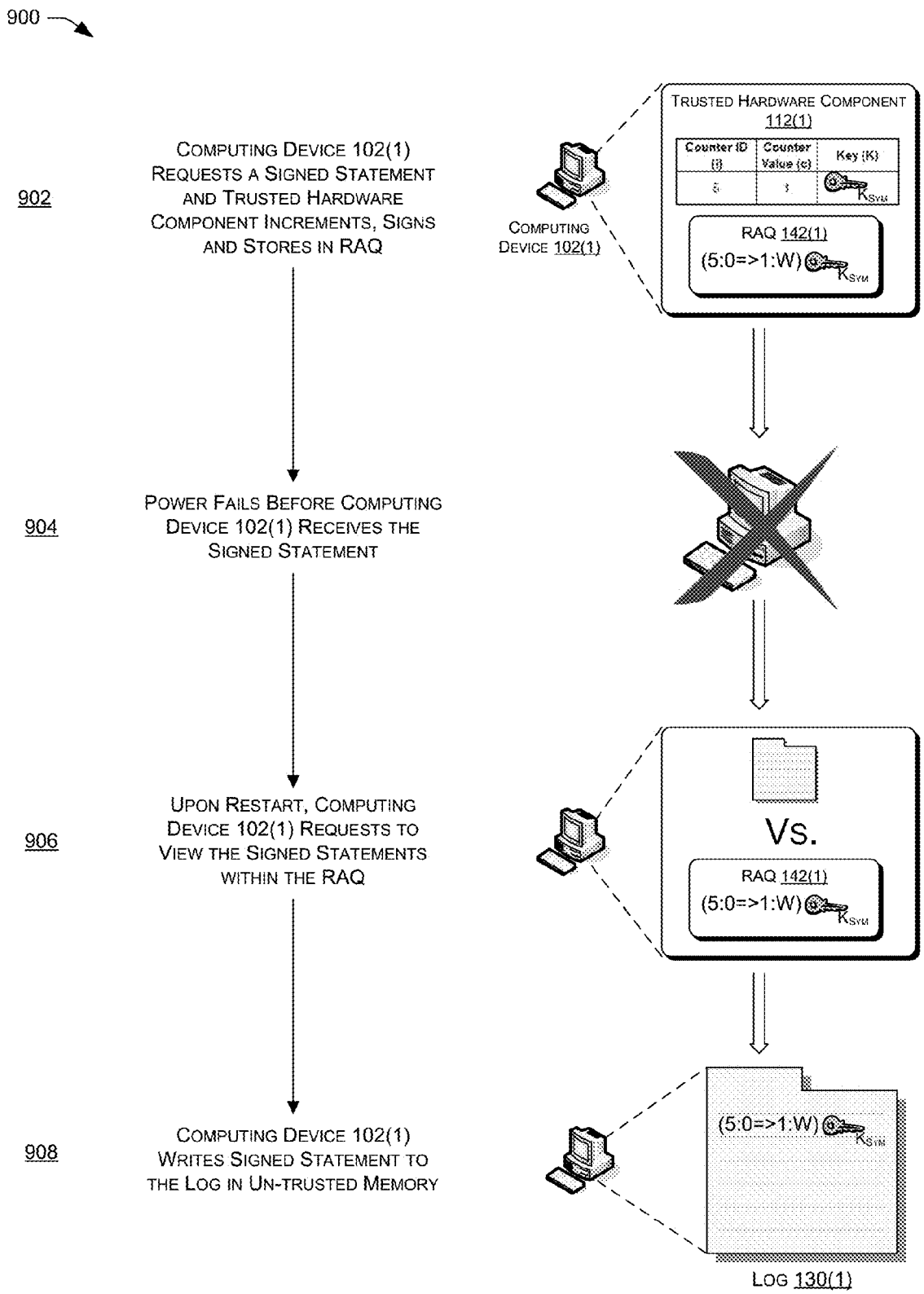
FIG. 9 is a flow diagram illustrating an example process for ensuring the legitimacy of a log of a participant computing device maintained in un-trusted memory in the event of a power failure.

FIG. 9 is a flow diagram illustrating an example process 900 for ensuring the legitimacy of a log 130(1)-(N) of a participant computing device 102(1)-(N) maintained in un-trusted memory in the event of a power failure.

The process 900 includes an operation 902. This operation may include a computing device 102(1) requesting a signed statement attesting to an increment of the counter by the trusted hardware component 112(1) in response to the device 102(1) providing a representation of a message to the component 112(1). In some instances, before submitting the representation of the message to the trusted hardware component 112(1), the computing device 102(1) may log the actual message itself, as discussed below.

In addition to requesting a signed statement, operation 902 represents that the trusted hardware component 112(1) may receive the hash value of the message, increment the counter (from 0 to 1), sign the statement ("5:0=>1:W") with the symmetric key 134(1) and contemporaneously store this signed statement in the RAQ 142(1). In some instances, the RAQ 142(1) is read-only in the event of a power failure or other condition that prevents the computing device 102(1) from updating the log maintained in un-trusted storage coincidently with the incrementing of the counter.

Operation 904 represents that a power failure may occur at the computing device 102(1) sometime between: (1) the contemporaneous signing and storing of the statement in the RAQ 142(1), and (2) the sending of the signed statement to the computing device 102(1).

Operation 906 represents that upon restart, the computing device 102(1) may request to view the signed statements stored within the RAQ 142(1) for comparison with the log 130(1) of the device 102(1) stored outside of the trusted hardware component 112(1). Here, the computing device 102(1) may find the signed statement from above stored in the RAQ 142(1). The device 102(1) may also recognize that the log 130(1) does not store this signed statement. As such, at operation 908 the device 102(1) may store this signed statement in the log 130(1), thus avoiding the occurrence of an incomplete log. To do so, the computing device 102(1) may determine that the signed statement (comprising a representation of the message) stored in the RAQ 142(1) corresponds to the message that the computing device 102(1) stored in the log before the power failure occurred. After making this determination, the computing device 102(1) may store the retrieved signed statement in the log 130(1) in association with the message that corresponds to the retrieved signed statement.

Example Processes

Figure 10:
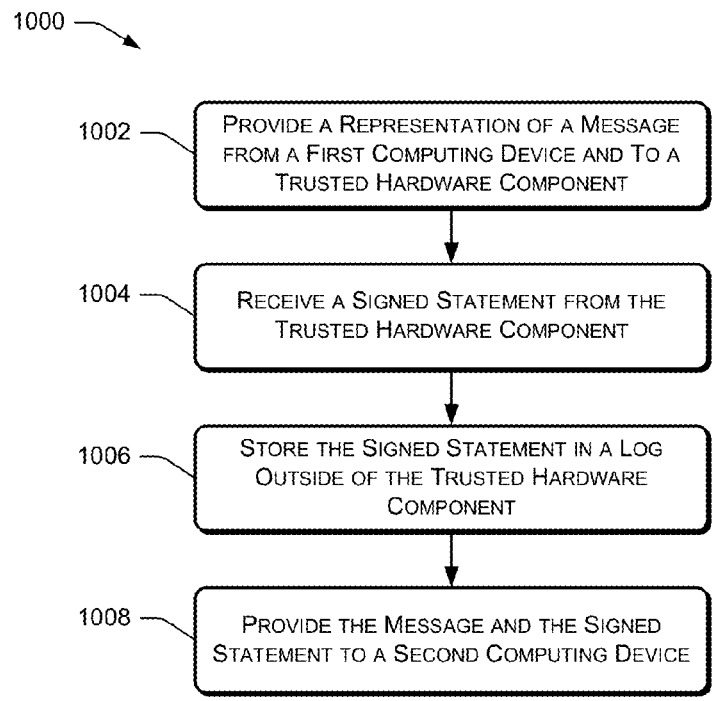
FIGS. 10-11 are flow diagrams of example processes for utilizing trusted hardware components for mitigating the effects of equivocating statements made by participants of a distributed system with use of the techniques described herein.
Figure 11:
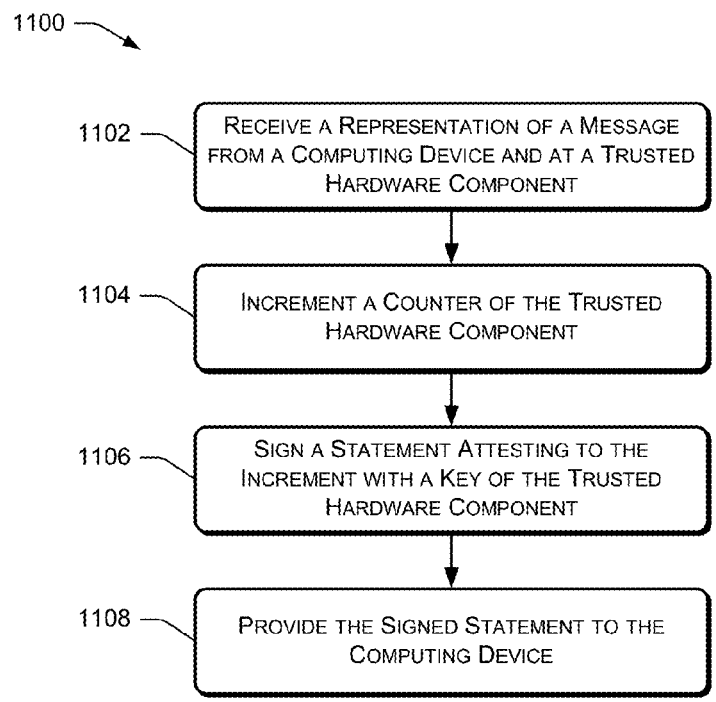

FIGS. 10-11 are flow diagrams illustrating example processes 1000 and 1100 for utilizing trusted hardware components for resisting equivocation amongst participants of a distributed system with use of the techniques described herein. Each of these processes is illustrated as a collection of blocks in a logical flow graph, which represents a sequence of operations that can be implemented in hardware, software, or a combination thereof In the context of software, the blocks represent computer instructions that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

FIG. 10 illustrates the process 1000, which includes operation 1002. At this operation, a first computing device participating in a byzantine-fault-tolerant protocol provides (to a trusted hardware component associated with the first computing device) a representation of a message for distribution to a second computing device participating in the byzantine-fault-tolerant protocol. Next, at operation 1004 the first computing device may receive (from the trusted hardware component) a statement signed by the trusted hardware component attesting that the trusted hardware component incremented a monotonically non-decreasing counter at least in part in response to receiving the representation of the message.

The process 1000 then proceeds to operation 1006, at which point the signed statement may be stored in a log associated with the byzantine-fault-tolerant protocol and maintained outside of the trusted hardware component. Finally, at operation 1008 the first computing device may provide the message and the signed statement to the second computing device.

FIG. 11 illustrates the process 1100 and includes an operation 1102. Here, a trusted hardware component comprising a counter and a key may receive, from a first computing device participating in a byzantine-fault-resilient protocol, a representation of a message for distribution to a second computing device participating in the byzantine-fault-resilient protocol. Next, at operation 1104 the trusted hardware component may increment the counter from a first value to a second value that is greater than or equal to the first value.

The process then proceeds to operation 1106, at which point the trusted hardware component may sign a statement with the key attesting that the trusted hardware component incremented the counter at least in part in response to the receiving of representation of the message. Finally, the process concludes at operation 1108, where the trusted hardware component may provide the signed statement to the first computing device.

Additional Details of Example Techniques

The above discussion has described and illustrated techniques for using the trusted hardware components 112(1)-(N) in a distributed system running a distributed protocol to mitigate the effects of faults caused by an equivocating device. The following sub-sections describe portions of non-limiting embodiments of these techniques in greater detail.

Overview of One Example Embodiment

To gain the benefits of the described techniques, a user may attach the trusted hardware component 112(1) to the device of the user. Unlike a typical trusted platform module (TPM), which attests to states of the associated computing device, the API of the trusted hardware component 112(1) may depend only on its internal state. As such, the trusted hardware component 112(1) may not need access to the state of the computing device. Instead, in some instances the trusted hardware component 112(1) only uses an un-trusted channel over which it can receive input and produce output, so even USB may be sufficient.

As described above, when computing device 102(1) wishes to send a message "m" to computing device 102(2), device 102(1) includes an attestation from the trusted hardware component 112(1) that: (1) binds m to a certain value of a counter, and (2) ensures computing device 102(2) that no other message will ever be bound to that value of that counter, even messages sent to other participant devices. A trusted hardware component enables such attestation by using a counter that monotonically increases with each new attestation or "signed statement" attesting to the binding. In this way, once the participant computing device 102(1) has bound a message m to a certain counter value c, this device will never be able to bind a different message to that value.

Some protocols may benefit from using multiple counters. In theory, anything done with multiple counters can be done with a single counter, but multiple counters allow certain performance optimizations and simplifications, such as assigning semantic meaning to a particular counter value. Furthermore, the user of a trusted hardware component may participate in multiple protocols, each requiring its own counter or counters. Therefore, a trusted hardware component provides the ability to allocate new counters as discussed above. However, the techniques should identify each of them uniquely so that a malicious user cannot create a new counter with the same identity as an old counter and thereby attest to a different message with the same counter identity and value.

As a performance optimization, the trusted hardware component 112(1) allows its attestations to be signed with shared symmetric keys, which may improve its performance over using asymmetric cryptography. To ensure that participants cannot generate arbitrary attestations, the symmetric key is stored in trusted memory, so that users of the participant devices cannot read it directly. Symmetric keys are shared among the trusted hardware components using a mechanism that ensures they will not be exposed to un-trusted parties.

Notation

The following discussion uses the notation $(x)_K$ to mean an attestation of x that could only be produced by an entity knowing K. If K is a symmetric key, then this attestation can be verified only by entities that know K; if K is a private key, then this attestation can be verified by anyone, or more accurately anyone who knows the corresponding public key. The following discussion also uses the notation $\{x\}_K$ to mean the value x encrypted with public key K, so that it can only be decrypted by entities knowing the corresponding private key.

State of the Trusted Hardware Component

This sub-section describes an internal state of an example trusted hardware component 112(1). Each trusted hardware component is endowed by its manufacturer with a unique identity "I" and a public/private key pair ($K_{pub}$, $K_{priv}$). In some instances, I is the hash of $K_{pub}$. The manufacturer may also include in the trusted hardware component an attestation "A" that proves the values I and $K_{pub}$ belong to a valid trusted hardware component, and therefore that the corresponding private key is unknown to un-trusted parties.

This discussion leaves open the question of what form A will take. This attestation is meant to be evaluated by users and/or by participant devices rather than trusted hardware components and, as such, may take various forms. For instance, it might be a certificate chain leading to a well-known authority trusted to oversee the production of trusted hardware components and ensure their secrets are well kept.

Another element of the state of the trusted hardware component is the meta-counter "M", discussed above.

Whenever the trusted hardware component creates a new logical counter, the trusted hardware component gives the new logical counter identity M and then increments M by one. This allows users (and participant devices) to create new counters at will, without sacrificing the non-monotonicity of any particular counter. Because M only goes up, once a counter has been created it can never be recreated by a malicious user attempting to reset it.

Yet another element is "Q" (corresponding to RAQ 142 (1)), a limited-size first-in-first-out (FIFO) queue containing the most recent few counter attestations generated by the trusted hardware component. Storing these recent attestations in the trusted component is useful for allowing users to recover from power failures, described above and in more detail below.

The state of the trusted hardware component may also include an array of counters, not all of which have to be in use at a time. For each in-use counter, the state includes the counter's identity "i", its current value "c", and its associated key "K". The identity "i" is, as described before, the value of the meta-counter when the counter was created. The value c is initialized to 0 at creation time and cannot go down (unless the counter is reset, which changes the counter's identity "i"). The key K contains a symmetric key to use for attestations of this counter; if K=0, attestations will use the private key $K_{priv}$ instead.

Trusted Hardware Component Application Programming Interface (API)

In some instances, the API of the trusted hardware component includes a call labeled "Attest". Attest takes three parameters: i, c', and h. Here, i is the identity of a counter to use, c' is the requested new value for that counter, and h is a hash of the message m to which the user wishes to bind the counter value. Attest works as follows in some instances:

Attest(i, c', h, n)
1. Assert that i is the identity of a valid counter.
2. Let c be the value of that counter, and K be the key.
3. Assert no roll-over: c is less than or equal to c'.
4. If K does not equal 0, then let a <= (I, i, c, c', h)$_K$; otherwise let a <= (I, 1, c, c', h)$_{Kpriv}$.
5. Insert a into Q, kicking out the oldest value.
6. Update c<=c'.
7. Return a.

Note that Attest allows calls with c'=c. This is crucial to allowing peers to attest to what their current counter value is without incrementing it. To allow for this while still keeping peers from equivocating, this example of the trusted hardware component includes both the prior counter value and the new one in the signed statement. One can easily differentiate attestations intended to learn a trusted hardware component's current counter value (c=c') from attestations that bind new messages (c<c').

Verifying Attestations

Suppose that the computing device 102(1) with the trusted hardware component 112(1) wants to send a message to the computing device 102(2) with the trusted hardware component 112(2). The computing device 102(1) first invokes "Attest" on the trusted hardware component 112(1) using the hash of the message, and may thereby obtain an attestation, a. Next, the device 102(1) sends the message to the device 102(2) along with this attestation. However, for the device 102(2) to accept this message, the device 102(2) has to be convinced that the attestation was created by a valid trusted hardware component. There are two cases to consider: first, that the attestation used the private key of the trusted hardware component 112(1) and, second, that the attestation used a shared symmetric key.

In the first case, an API call such as a call "GetCertificate" may be useful. This call returns a certificate C of the form (I, $K_{pub}$, A), for which I is the identity of the trusted hardware component, $K_{pub}$ is its public key, and A is an attestation that I and $K_{pub}$ belong to a valid trusted hardware component. The computing device 102(1) can call this API routine and send the resulting certificate to the device 102(2). The device 102(2) can then learn the public key of the device 102(1) and verify that this is a valid public key of a trusted hardware component. After this, the device 102(2) can verify the attestation that the device 102(1) attached to the message, as well as any future attestations that the device 102(1) attaches to messages.

In the second case, an API call such as a call "CheckAttestation" may be useful. When CheckAttestation(a, i) is invoked on a trusted hardware component, the trusted hardware component checks whether a is the output of invoking Attest on a trusted hardware component using the same symmetric key as the one associated with the local counter i. It returns a boolean indicating whether this is so. So, if the device 102(1) sends the device 102(2) an attestation signed with a shared symmetric key, the device 102(2) can invoke CheckAttestation on the trusted hardware component of the device to learn whether the attestation is valid.

Allocating Counters

Since a trusted hardware component may contain many counters, another important component of the API is the creation of these counters. The trusted hardware component creates new logical counters and allows counters to be deleted, but never resets an existing counter. Logical counters are identified by a unique ID, generated using a non-deletable, monotonic meta-counter M. Every trusted hardware component may have precisely one meta-counter, and when it expires, the trusted hardware component can no longer be used. The described techniques may compensate for this by making M 64 bits, by only incrementing M, and by assigning no semantic meaning to the value of M. The trusted hardware component exports a "CreateCounter" function that allocates a new counter with identity i=M, initial value 0, and initial key K=0; and returns this new identity i. The current value of M is then incremented by one. When the device no longer needs the counter, the device may call "FreeCounter" to free it and thereby provide space in the trusted hardware component for a new counter.

Using Symmetric Keys

The trusted hardware component allows its attestations to be signed with shared symmetric keys, which may improve its performance over using asymmetric cryptography or even secure hashes. A session refers to a set of users using a single symmetric key for a certain purpose. Creating a session requires a session administrator (i.e., trusted administrator 106), a user trusted by all participants to create a session key and keep it safe (i.e., trusted to not reveal it to any un-trusted parties).

To create a session, the "session administrator" or "trusted administrator" simply generates a random, fresh symmetric key as the session key K. To allow a certain device to join the session, the administrator asks that device for the certificate of the trusted hardware component of the device. If the administrator is satisfied that the certificate represents a valid trusted hardware component, the administrator encrypts the key in a way that ensures it can only be decrypted by that trusted hardware component. Specifically, the administrator creates {KEY, K}$K_{pub}$, where $K_{pub}$ is the public key in the certificate. The administrator then sends this encrypted session key to the device that wants to join the session.

Upon receipt of an encrypted session key, the device can join one of his counters to the session by using an API call such as a call "ImportSymmetricKey(S, i)". This call checks that S is a valid encrypted symmetric key, meant to be decrypted by the local private key. If so, the trusted hardware component decrypts the session key and installs it as K for local counter i. From this point forward, attestations for this counter will use the symmetric key. Also, the device will be able to verify any attestation from a trusted hardware component using this symmetric key by invoking "CheckAttestation(a, i)".

Handling Power Failures

As discussed above, the techniques described herein also provide a safe and efficient manner of handling a power failure. If there is a power failure between the time that the trusted hardware component advances its counter and the application of the participant device writes the attestation to disk, then the attestation is lost. This can be problematic for many protocols, which rely on the device being able to attest to a message with a particular counter value. For instance, if the computing device 102(1) cannot produce an attestation for counter value v, another computing device 102(2) may suspect this is because device 102(1) has already told a device 102(N) about some message m associated with that counter value. Not wanting to be wrong about the absence of such a message, the device 102(2) may lose all willingness to trust the device 102(1). In addition, the computing device can not simply "repeat" the attestation for counter value v, because the counter value of the counter in the trusted component has already been incremented. Because the counter may not be decreased (unless reset), no other message can be attested to using a counter value v.

To alleviate this, a trusted hardware component includes a queue Q containing the most recent attestations it has created. To limit the storage requirements, this queue only holds a certain fixed number k of entries, perhaps 10. In the event of a power failure, after recovery the device can invoke an API call such as a call "GetRecentAttestations" to retrieve the contents of Q. Thus, to protect against power failure, a device is to ensure that it writes an attestation to disk before the device makes a $k^{th}$ next attestation request. As long as k is at least 1, the device can safely use the trusted hardware component for any application. Higher values of k are useful as a performance optimization, allowing greater pipelining between writing to disk and submitting attestations.

The techniques may also protect against a power failure that occurs to the trusted hardware component. The Attest algorithm ensures that the attestation is inserted into the queue before the counter is updated, so the trusted hardware component cannot enter a situation where the counter has been updated but the attestation is unavailable. It can, however, enter the dangerous situation in which the attestation is in Q, and thus available to the device, but the counter has not been incremented. This window of vulnerability could potentially be exploited by a user of a device to generate multiple attestations for the same counter value, if the user could arrange to shut off power at precisely this intervening time. However, the described techniques guard against this case by having the trusted hardware component check Q whenever it starts up. At startup, before handling any requests, it checks all attestations in Q and removes any that refer to counter values beyond the current one.

Local Adversaries

Mutually distrusting principals on a single computing device will share access to a single trusted hardware component, creating the potential for conflict between them. Although they cannot equivocate to remote parties, they can hurt each other. They can impersonate each other by using the same counter, and they can deny service to each other by exhausting shared resources within the trusted hardware component. Resource exhaustion attacks include allocating all available counters, submitting requests at a high rate, and rapidly filling the queue Q to prevent the pipelining performance optimization.

The operating system can solve this problem by mediating access to the trusted hardware component, just as it mediates access to other devices. In this way, the OS can prevent a principal from using counters allocated to other principals, and can use rate limiting and quotas to prevent resource exhaustion. Equivocation to remote parties is impossible, even if an adversary has root access to the computing device, since cryptography allows the trusted hardware component to communicate securely even over an un-trusted channel.

Use of the Trusted Hardware Component for Attested Append-Only Memory (A2M)

Attested Append-only Memory (A2M) is another proposed trusted hardware design with the intent of combating equivocation. A2M offers trusted logs, to which devices can only append. The fundamental difference between the designs of A2M and techniques describes herein is in the amount of state and computation required from the trusted hardware. To demonstrate that the decreased complexity of the described techniques is enough, the following sections discuss how to build A2M using the techniques described herein.

A2M Overview

A2M's state consists of a set of logs, each containing entries with monotonically increasing sequence numbers. A2M supports operations to add (append and advance), retrieve (lookup and end), and delete (truncate) items from its logs. The basis of A2M's resilience to equivocation is append, which binds a message to a unique sequence number. For each log q, A2M stores the lowest sequence number, $L_q$, and the highest sequence number, $H_q$, stored in q. A2M appends an entry to log q by incrementing the sequence number $H_q$ and setting the new entry's sequence number to be this incremented value. The low and high sequence numbers allow A2M to attest to failed lookups; for instance, if a user requests an item with sequence number $s > H_q$, A2M returns an attestation of $H_q$.

Trusted Logs with the Described Techniques

In the design of A2M using the described techniques, logs are stored in un-trusted memory as opposed to within the trusted hardware component. As in A2M, the techniques make use of two counters per log, representing the highest ($H_q$) and lowest ($L_q$) sequence number in the respective log q.

Algorithm 2, reproduced immediately below, illustrates the design's characteristics. Note the power of the API of the described techniques, as the design is built predominately on calls to an Attest function of a trusted hardware component. The described protocol also uses advance attestations for moving the high sequence number when appending to the log, and for moving the low sequence number when deleting from the log. The techniques perform status attestations of the low counter value to attest to failed lookups, and of the high counter to attest to the end of the log. No additional attestations are necessary for a successful lookup, even if the lookup is to a skipped entry. Conversely, A2M requires calls to the trusted hardware even for successful lookups.

Algorithm 2:

Init( )
   1. Create low and high counters:
      $L_q$ <= CreateCounter( ); $H_q$ <= CreateCounter( )
   2. Return $\{L_q, H_q\}$
Append(queue q, value x)
   1. Bind h(x) to a unique counter (the current "high counter"):
      A <= Attest($H_q$.id, $H_q$.ctr + 1, h(x))
   2. Store the attestation in un-trusted memory:
      q.append(a, x)
Lookup(queue q, sequence number n, nonce z)
   1. If n < $L_q$, the entry was truncated. Attest to this by returning an attestation of the supplied nonce using the low-counter:
      Attest($L_q$.id, $L_q$.ctr, h(FORGOTTEN||z))
   2. If n > $H_q$, the query is too early. Attest to this by returning an attestation of the supplied nonce using the high-counter:
      Attest($H_q$.id, $H_q$.ctr, h(TOOEARLY||z))
   3. Otherwise, return the entry in q that spans n, i.e., the one such that a.c < n is less than or equal to a.c'. Note that if n < a.c', this means n was skipped by an Advance.
End(queue q, sequence number n, nonce z)
   1. Retrieve the latest entry from the given log:
      {a, x} <= q.end( )
   2. Attest that this is the latest entry with a high-counter attestation of the supplied nonce:
      a' <= Attest($H_q$.id, $H_q$.ctr, z)
   3. Return {a', {a, x}}
Truncate(queue q, sequence number n)
   1. Remove the entries from un-trusted memory:
      q.truncate(n)
   2. Move up the low counter:
      a <= Attest($L_q$.id, n, FORGOTTEN)
Advance(queue q, sequence number n, value x)
   1. Append a new item with sequence number n:
      a <= Attest($H_q$.id, n, h(x))
   2. Store the attestation in un-trusted memory:
      q.append(a, x)

Properties of the Resulting System

The resulting system of using the described techniques with A2M demonstrates that the described techniques can be applied to byzantine fault tolerant protocols, SUNDR protocols, and Q/U protocols, among others. In addition, implementing trusted logs using the techniques described herein has several benefits over a completely in-hardware design like A2M. Because the described techniques store the logs in un-trusted storage, the techniques decouple the usage demand of the trusted log from the amount of available trusted storage. Conversely, limited by the amount of trusted storage, A2M must make more frequent calls to truncate to keep the logs small. Some systems, meanwhile, benefit from large logs, making the techniques described herein a more suitable addition.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

We claim:

1. A method comprising:
receiving, by a hardware component and from a first computing device, a representation of a message, the message to be sent to a second computing device, the first computing device and the second computing device participating in a byzantine fault-tolerant protocol;
incrementing, by the hardware component, a monotonically non-decreasing counter from a first value to a second value that is greater than or equal to the first value based at least in part on receiving the representation of the message;
assigning the monotonically non-decreasing counter to a particular conversation between the first computing device and a second computing device, the particular conversation including the message;
binding, by the hardware component, the message to the second value of the monotonically non-decreasing counter;
creating, by the hardware component, a statement that includes the monotonically non-decreasing counter and includes the representation of the message, the statement attesting:
that the hardware component incremented the monotonically non-decreasing counter from the first value to the second value based at least in part on receiving the representation of the message; and
that no other message is to be bound to the second value of the monotonically non-decreasing counter;
signing, by the hardware component, the statement with a cryptographic key to create a signed statement;
sending the signed statement to the first computing device; and
storing the signed statement in a recent attestation queue used to store a predetermined number of most-recently signed statements, each of the most-recently signed statements attesting to a particular increment of the monotonically non-decreasing counter by the hardware component.

2. A method as recited in claim 1, wherein the cryptographic key comprises a symmetric key that is common to the hardware component of the first computing device and a second hardware component of the second computing device.

3. A method as recited in claim 1, further comprising:
maintaining, by the hardware component, a log comprising the signed statement and one or more previously-signed statements.

4. A method as recited in claim 1,
further comprising:
receiving, by the hardware component from the first computing device, a representation of a second message and an instruction to increment the monotonically non-decreasing counter to a specified value that is greater than the second value;
incrementing, by the hardware component, the monotonically non-decreasing counter from the second value to the specified value;
signing, by the hardware component, a statement with the cryptographic key attesting that the hardware component incremented the monotonically non-decreasing counter from the second value to the specified value based at least in part on receiving the representation of the second message; and
sending the signed statement associated with the representation of the second message to the first computing device.

5. A method as recited in claim 1, wherein the hardware component is free from a log other than the recent attestation queue (RAQ).

6. A method as recited in claim 1, wherein the hardware component further comprises:
a monotonically increasing meta-counter; and
multiple other monotonically non-decreasing counters;
and wherein the method further comprises:

receiving, by the hardware component, a request from the first computing device to create a new counter for a new protocol;

assigning, by the hardware component, one of the multiple other monotonically non-decreasing counters as the new counter;

assigning, by the hardware component, a current value of the monotonically increasing meta-counter as an identity of the new counter; and incrementing, by the hardware component, the current value of the monotonically increasing meta-counter to a new, greater current value.

7. A method as recited in claim 1, wherein the hardware component comprises a third computing device participating in the byzantine fault-tolerant protocol.

8. A method as recited in claim 1, wherein:

multiple additional computing devices participate in the byzantine fault-tolerant protocol; and each of multiple additional hardware components is associated with a respective one of the multiple additional computing devices.

9. A computer-readable memory device storing computer-executable instructions that, when executed, cause one or more processors to perform operations comprising:

sending a representation of a message, by a first computing device participating in a byzantine-fault-tolerant protocol, to a trusted hardware component associated with the first computing device;

receiving, by the first computing device and from the trusted hardware component, a signed statement that is signed by the trusted hardware component using a key, the signed statement attesting that the trusted hardware component incremented a monotonically non-decreasing counter from a first value to a second value that is greater than or equal to the first value based at least in part on receiving the representation of the message, attesting that the second value is bound to the message, and attesting that no other message will be bound to the second value of the monotonically non-decreasing counter, wherein the monotonically non-decreasing counter is assigned to a particular conversation between the first computing device and a second computing device, the particular conversation including the message;

determining that the signed statement includes the monotonically non-decreasing counter and includes the representation of the message;

storing the signed statement in a log associated with the byzantine-fault-tolerant protocol and maintained in untrusted memory located outside of the trusted hardware component;

sending the message and the signed statement to the second computing device; and storing the signed statement in a recent attestation queue in untrusted memory.

10. The computer-readable memory device as recited in claim 9, the operations further comprising:

restarting the first computing device after a power failure;

requesting, by the first computing device, to view the signed statement in the recent attestation queue; and writing, by the first computing device, the signed statement to a log in untrusted memory.

11. The computer-readable memory device as recited in claim 9, wherein the log comprises multiple other previously-signed statements received by the first computing device and from the trusted hardware component, and wherein the first computing device maintains the log in un-trusted memory of the first computing device.

12. The computer-readable memory device as recited in claim 9, the operations further comprising:

providing, by the first computing device and to the trusted hardware component: (i) a nonce received by the first computing device from the second computing device, and (ii) a request to move in place the monotonically non-decreasing counter of the trusted hardware component in association with the nonce;

receiving a signed statement that is signed by the trusted hardware component attesting that the trusted hardware component moved in place the monotonically non-decreasing counter at least in part in response to receiving the nonce and the request; and providing the signed statement to another computing device participating in the byzantine-fault-tolerant protocol.

13. The computer-readable memory device as recited in claim 9, wherein the monotonically non-decreasing counter comprises one of multiple monotonically non-decreasing counters of the trusted hardware component, and the operations further comprising:

receiving a request from the first computing device to create a new counter for a new protocol;

assigning an unused monotonically non-decreasing counter of the multiple monotonically non-decreasing counters as the new counter and assigning a current value of a monotonically increasing meta-counter as an identity of the new counter; and incrementing the current value of the monotonically increasing meta-counter to a new, greater current value.

14. The computer-readable memory device as recited in claim 9, the operations further comprising:

receiving, by the first computing device and from a third computing device participating in the byzantine-fault-tolerant protocol, a message and an additional statement signed by a trusted hardware component of the third computing device and attesting that the trusted hardware component of the third computing device incremented a monotonically non-decreasing counter in association with message; and verifying that the trusted hardware component of the third computing device signed the additional statement received from the third computing device.

15. The computer-readable memory device as recited in claim 14, wherein the signed statement is signed by a private key of the trusted hardware component of the third computing device, and wherein the verifying of the signed statement comprises verifying the signed statement by the first computing device with a public key of the trusted hardware component of the third computing device.

16. The computer-readable memory device as recited in claim 14, wherein the signed statement is signed by a symmetric key that is common to each trusted hardware component participating in the byzantine-fault-tolerant protocol, and wherein the verifying of the signed statement comprises providing, by the first computing device, the signed statement to the trusted hardware component of the first computing device for verifying the signed statement with the symmetric key by the trusted hardware component.

17. A computer-readable storage device storing computer-executable instructions that, when executed, cause one or more processors to perform operations comprising:

receiving, by a trusted hardware component, a key and a representation of a message from a first computing device, the representation of the message to be sent to a second computing device, the first computing device and the second computing device participating in a byzantine-fault-resilient protocol;

incrementing, by the trusted hardware component, a monotonically non-decreasing counter from a first value to a second value that is greater than the first value based at least in part on receiving the representation of the message;

associating the monotonically non-decreasing counter with a particular conversation, between the first computing device and the second computing device, that includes the message;

binding the second value of the monotonically non-decreasing counter to the message;

creating, by the trusted hardware component, a statement that includes the monotonically non-decreasing counter and includes the representation of the message, the statement attesting:

that the trusted hardware component incremented the monotonically non-decreasing counter from the first value to the second value based at least in part on receiving the representation of the message; and that no other message is to be bound to the second value of the monotonically non-decreasing counter;

signing, by the trusted hardware component, the statement with the key to create a signed statement;

sending the signed statement to the first computing device; and storing the signed statement in a recent attestation queue.

18. The computer-readable storage device as recited in claim 17, wherein the byzantine-fault-resilient protocol comprises a byzantine-fault-tolerant protocol, a byzantine-fault-detection protocol or a byzantine-fault-isolation protocol.

19. The computer-readable storage device as recited in claim 17, wherein the key comprises a symmetric key that is common to the trusted hardware component and a trusted hardware component of the second computing device.

20. The computer-readable storage device as recited in claim 19, further storing computer-executable instructions that, when executed, cause the one or more processors to perform acts comprising:

before the signing of the statement:

receiving, from a trusted administrator and at the trusted hardware component, the symmetric key encrypted by a public key of the trusted hardware component;

decrypting the symmetric key using a private key of the trusted hardware component; and storing the symmetric key within the trusted hardware component.

* * * * *